United States Patent
Kaufman et al.

(10) Patent No.: US 11,425,465 B2
(45) Date of Patent: *Aug. 23, 2022

(54) DEMAND BASED SELECTION FOR CELLULAR BROADCAST STREAMING MEDIA

(71) Applicant: AT&T Intellectual Property I, L.P., Atlanta, GA (US)

(72) Inventors: Darren Kaufman, Sarasota, FL (US); Frank Coppa, Kansas City, MO (US); Christopher Heck, Lees Summit, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/142,864

(22) Filed: Jan. 6, 2021

(65) Prior Publication Data
US 2021/0127167 A1     Apr. 29, 2021

Related U.S. Application Data

(63) Continuation of application No. 16/046,558, filed on Jul. 26, 2018, now Pat. No. 10,917,695.

(51) Int. Cl.
*H04N 21/475* (2011.01)
*H04N 21/6405* (2011.01)
*H04N 21/25* (2011.01)
*H04N 21/61* (2011.01)

(52) U.S. Cl.
CPC ....... *H04N 21/4758* (2013.01); *H04N 21/252* (2013.01); *H04N 21/6131* (2013.01); *H04N 21/6405* (2013.01)

(58) Field of Classification Search
CPC .......... H04N 21/4758; H04N 21/6405; H04N 21/252; H04N 21/6131
See application file for complete search history.

(56) References Cited

U.S. PATENT DOCUMENTS

| | | |
|---|---|---|
| 7,085,845 B2 | 8/2006 | Woodward et al. |
| 8,429,700 B2 | 4/2013 | Ashley et al. |
| 8,666,950 B2 | 3/2014 | Wohlert |
| (Continued) | | |

FOREIGN PATENT DOCUMENTS

JP     2002014685 A     1/2002

*Primary Examiner* — Yassin Alata
(74) *Attorney, Agent, or Firm* — Guntin & Gust, PLC; Kenneth Kwan

(57) ABSTRACT

Aspects of the subject disclosure may include, for example, determining available media content items and identifying a first number of wireless broadcast channels of a wireless network having a limited channel capacity and adapted to broadcast media content items within a coverage area. A demand for a group of media content items is identified, and media content items are selected according to the demand, wherein broadcasting of the selected media content items within the coverage area does not exceed the limited channel capacity. The selected media content items are assigned to a group of broadcast channels of the first number of wireless broadcast channels to obtain a broadcast channel assignment for the coverage area. The wireless network is configured to broadcast the selected media content items within the coverage area via wireless broadcast channels according to the broadcast channel assignment. Other embodiments are disclosed.

20 Claims, 12 Drawing Sheets

(56) References Cited

U.S. PATENT DOCUMENTS

| | | |
|---|---|---|
| 8,832,722 B2 | 9/2014 | Sharma et al. |
| 9,197,916 B2 | 11/2015 | Thomas et al. |
| 9,769,236 B2 | 9/2017 | Einarsson et al. |
| 2003/0226142 A1 | 12/2003 | Rand |
| 2010/0064306 A1 | 3/2010 | Tiongson et al. |
| 2011/0281517 A1 | 11/2011 | Ukkadam |
| 2015/0067754 A1 | 3/2015 | Wiser et al. |
| 2015/0100667 A1 | 4/2015 | Freyria et al. |
| 2015/0215373 A1 | 7/2015 | Marovets |
| 2015/0334465 A1 | 11/2015 | Marshall et al. |
| 2018/0114263 A1 | 4/2018 | Knight et al. |
| 2020/0007934 A1 | 1/2020 | Ortiz et al. |
| 2020/0037035 A1 | 1/2020 | Kaufman et al. |

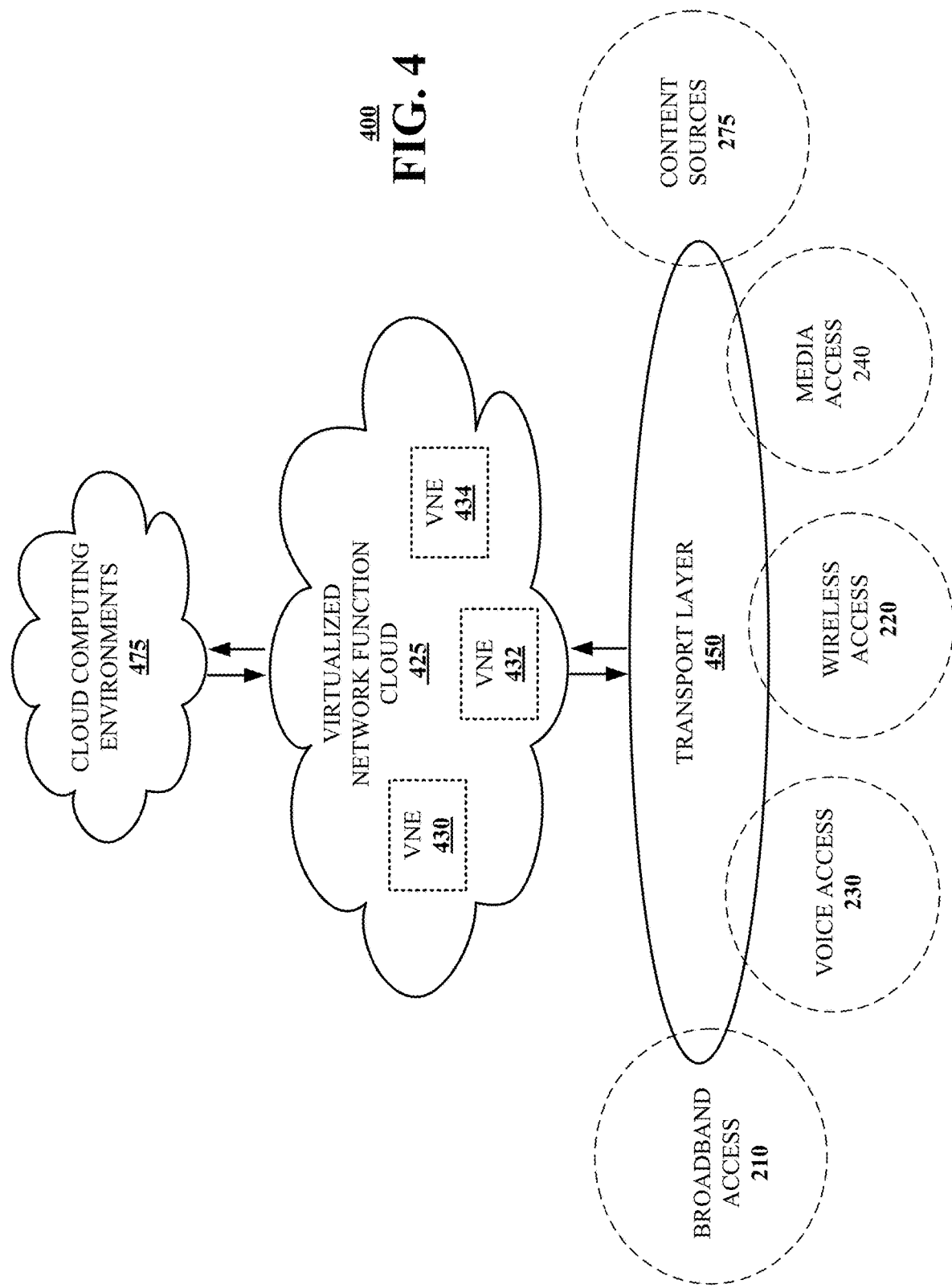

DEMAND BASED SELECTION FOR CELLULAR BROADCAST STREAMING MEDIA

CROSS-REFERENCE TO RELATED APPLICATIONS

This application is a continuation of and claims priority to U.S. patent application Ser. No. 16/046,558, filed Jul. 26, 2018. The contents of the foregoing are hereby incorporated by reference into this application as if set forth herein in full.

FIELD OF THE DISCLOSURE

The subject disclosure relates to demand based selection for cellular broadcast streaming media.

BACKGROUND

Empowered by the next generation of wireless technology, cellular networks can provide mobile users with access to information from the Internet such as streaming media, e.g., streaming audio, streaming video, video on demand, video conferences, databases, etc. Even with high bandwidth connection provided by advanced cellular systems, however, there remains a bottleneck between the cellular network and the mobile devices. This condition hinders the ability of mobile cellular users to fully exploit the capabilities of the advanced cellular networks. Since smooth and effective data flow is important to users, this bottleneck can hinder recent trends in moving away from traditional cable service.

Media streaming services may interface with mobile applications, or clients residing on users' mobile devices, e.g., smartphones. For example, music may be streamed from servers of a music streaming service to a mobile application of a smartphone device using a multicasting protocol. A similar architecture may be used where video is streamed to mobile application clients from servers of a video streaming service. A telecommunications service provider network acts as a pass-through data service which simply transmits and receives Internet Protocol (IP) packets to facilitate media streaming.

BRIEF DESCRIPTION OF THE DRAWINGS

Reference will now be made to the accompanying drawings, which are not necessarily drawn to scale, and wherein:

FIG. 4 is a block diagram illustrating an example, non-limiting embodiment of a virtualized communication network in accordance with various aspects described herein.

DETAILED DESCRIPTION

Figure 1:
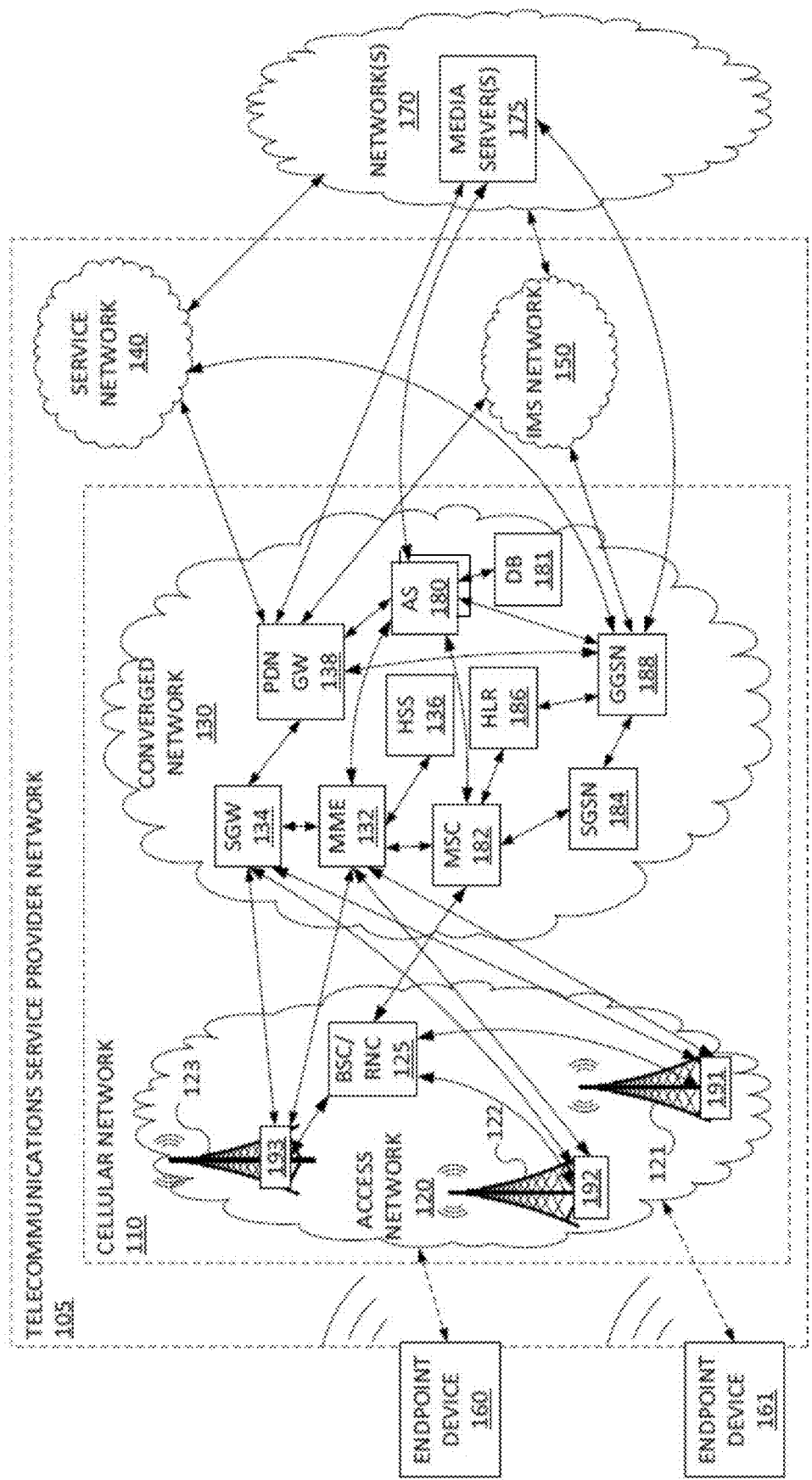
FIG. 1 is a block diagram illustrating an example, non-limiting embodiment of a communications network in accordance with various aspects described herein.

The subject disclosure describes, among other things, illustrative embodiments for devices, processes and computer-readable media for determining a demand for media programming and selecting media programs for broadcasting and/or multicasting via a broadcast and/or multicast channel of a base station based upon the determined demand, e.g., within a cellular network. Examples of the present disclosure distribute media programs via mobile networks, including but not limited to cellular broadcast networks, in a more efficient manner than each endpoint device receiving a unique stream through the entire system. Other embodiments are described in the subject disclosure.

One or more aspects of the subject disclosure include a device, including a processing system having a processor and a memory that stores executable instructions. The instructions, when executed by the processing system, facilitate performance of operations. The operations include determining a number of available streaming media programs and identifying a first number of wireless broadcast channels of a mobile cellular network. The mobile cellular network is adapted to broadcast streaming media within a coverage area. The first number of wireless broadcast channels includes a limited channel capacity. A consumer demand is determined for a group of streaming media programs of the number of available streaming media programs. Streaming media programs of the group of streaming media programs are selected to obtain selected streaming media programs according to the consumer demand, wherein a broadcasting of the selected streaming media programs within the coverage area does not exceed the limited channel capacity. The selected streaming media programs are assigned to a group of broadcast channels of the first number of wireless broadcast channels to obtain a broadcast channel assignment for the coverage area. The mobile cellular network is configured to broadcast the selected streaming media programs within the coverage area via wireless broadcast channels of the first number of wireless broadcast channels according to the broadcast channel assignment.

One or more aspects of the subject disclosure include a process, including determining, by a processing system including a processor, a number of available streaming media items. A first number of wireless broadcast channels of a mobile network; are identified by the processing system, wherein the first number of wireless broadcast channels are adapted to broadcast streaming media items within a coverage area. The first number of wireless broadcast channels have a limited channel capacity. A user demand is determined by the processing system for a group of streaming media items of the number of available streaming media items. Streaming media items of the group of streaming media items are selected by the processing system to obtain selected streaming media items according to the user demand, wherein a broadcasting of the selected streaming media items within the coverage area does not exceed the limited channel capacity. The selected streaming media items are assigned by the processing system to a group of broadcast channels of the first number of wireless broadcast channels to obtain a broadcast channel assignment for the coverage area. The mobile network is configured to broadcast the selected streaming media items within the coverage area via wireless broadcast channels of the first number of wireless broadcast channels according to the broadcast channel assignment.

One or more aspects of the subject disclosure include a non-transitory, machine-readable medium, comprising executable instructions that, when executed by a processing system including a processor, facilitate performance of operations. The operations include determining a number of available media content items and identifying a first number of wireless broadcast channels of a wireless network. The wireless network is adapted to broadcast media content items within a coverage area, wherein the first number of wireless broadcast channels has a limited channel capacity. A demand is determined for a group of media content items of the number of available media content items. Media content items of the group of media content items are selected to obtain selected media content items according to the demand, wherein a broadcasting of the selected media content items within the coverage area does not exceed the limited channel capacity. The selected media content items are assigned to a group of broadcast channels of the first number of wireless broadcast channels to obtain a broadcast channel assignment for the coverage area. The wireless network is configured to broadcast the selected media content items within the coverage area via wireless broadcast channels of the first number of wireless broadcast channels according to the broadcast channel assignment.

For instance, many users in a common wireless service area may want to connect to the same media stream, such as a live event stream. It is customary for each endpoint device to establish a unique data session extending through a telecommunications service provider network to a source. For cellular endpoint devices, each endpoint device may be allocated one or more unique radio frequency (RF) carriers, time slots, and/or resource blocks, for a data session, with subsequent wired transport back from the cell site into the core network and/or the cloud. Thus, each of the endpoint devices uses an incremental amount of bandwidth for the respective sessions. In contrast, examples of the present disclosure allocate shared RF bandwidth in an efficient manner based on demand and/or trends to deliver a series or selection of media content, such as programs, e.g., live broadcast content, pre-scheduled content, and so on, via the cellular network. Shared RF bandwidth allows some or all endpoint devices in a wireless coverage area, e.g., a cell and/or sector, can share the same broadcast stream and use one shared session, while the endpoint devices are not necessarily connected to each other.

Without limitation, example broadcast media content may include video and/or audio programs relating to preprogrammed content that can include one or more of live sporting events, news, weather, scheduled television and/or audio programming, pay-per-view programs, advertisements and other types of media content. Generally, although not necessary, such programs and/or advertisements are presented via a media delivery system at a time that is selected by a network operator and/or a media provider, without input or selection from users as to the timing of the delivery of the media programs and/or advertisements.

In one example, a cellular network receives media content from a media provider, e.g., via a content distribution network. For instance, the media content may be distributed via a satellite receiver or via a wired network, and placed into one or more servers of the cellular network that can distribute the content. In one example, control information and the actual media content are delivered to cell sites, e.g., base stations and/or related components, such as radio network controllers (RNCs), base station controllers (BSCs), media control units (MCUs), wireless access points, and so forth. In one example, base stations broadcast the control data in the form of a manifest file, e.g., an extensible markup language (XML)/text based file. The manifest file can identify one or more of broadcast and/or multicast services, and media programs associated with broadcast and/or multicast media service. In one example, the media programs may be broadcast/transmitted via different broadcast channels, e.g., RF resource blocks or the like, which may be selected from a pool of available RF resources of the base station.

In addition, in one example the manifest file is transmitted on a particular broadcast channel, e.g., a control channel, of the base station. For instance, a known control channel may be used to broadcast a manifest file at each cell site. The manifest file for each cell site may identify the media programs that are available at that cell site, and may provide source specific multicast (SSM) Internet Protocol (IP) addresses assigned to the media programs. An endpoint device may then request, e.g., subscribe, to a particular media program by sending a request with the SSM IP address. Such elections, subscriptions, selections or choices can be recorded as preferential demand data. A response may be provided to the endpoint device identifying a broadcast channel on which the media program is broadcast by the base station.

As described above, in a streaming media cellular broadcast system, media content, e.g., programs, may be delivered to users from cell sites from which selected media programs are transmitted on multicast/broadcast channels. It is understood that resources of any media content delivery system have limitations, such that particular media content made available to content consumers may be less than available source content accessible by the media content delivery system. In mobile networks, limited wireless spectrum can represent one such category of limitations. Spectrum allocations can be made according to available channels, e.g., particular frequencies and/or bandwidths, time slots, resource blocks, geographic regions, e.g., cells and/or sectors, and so on. Selection of one or more media streams can be determined by a stream selector that a selects or otherwise identifies a subset of available source content. The media delivery system can provide the selected media content as available content or streams to content consumers. Consumers may then select from among different channels of available content to consume particular media content of their choice.

In at least some embodiments, streaming media selections can be based on consumer or user demand. The user demand can include actual demand, estimated and/or predicted demand, or a combination of both. Demand can be based on current usage data, e.g., current data sessions of active users. Current usage can be obtained, e.g., from mobile service providers tracking content consumption and/or from mobile applications used in selecting and/or consuming content. This can be referred to as usage data. Alternatively or in addition, demand can be determined from preferential demand data. For example, user preferences can be determined based on searches. Search results can be obtained from internal media content delivery systems, e.g., mobile media access application, electronic program guides. Alternatively or in addition, search results can be obtained from external systems and/or applications, such as web browser searches, social media applications, and the like. Associations of search terms and/or search results can be analyzed algorithmically to associate search terms and/or results with current and/or future distribution of available media content items. Such associations would support associations of media content items with a limited number of broadcast/multicast channels.

In at least some embodiments, user preference data can be obtained from user profiles. User profiles can include user input data, such as menu item selections, age, gender, group associations, e.g., affinity groups, self-identified likes and/or dislikes, educational background, profession, address, social media friends, past viewing history, DVR recording of past, present and/or future programming, and so on. Alternatively or in addition, user profiles can be established and/or maintained by others, such as mobile service providers, content providers, advertisers, third party service providers and the like.

It is understood that in at least some embodiments, preference data can be obtained by solicitations. For example, a menu or list of media content items can be sent out periodically, e.g., by mobile service providers, streaming media service providers, third party solicitors, with an expectation that at least some recipients will respond with one or more selections from the menu or list. The selections can be for specific media content items, such as a particular program, series, and/or a particular episode of a series. Alternatively or in addition, the selections can be more general. Examples of more general solicitations may include content categories, e.g., news, comedy, documentaries, sports, content formats, e.g., short programs, movies, high definition, 4K, and so on.

In some embodiments, demand is based on consumer responses to a solicitation based on an election event. An election event can include a prescheduled voting period, e.g., a predetermined period before a pre-scheduled program starts. Voting can be accomplished in an application, such as a dedicated mobile voting application, a media delivery and/or consumption application, a social media application. Alternatively or in addition, voting can be accomplished by email, text messaging, voice calls, and the like. For example, a voting window can be opened for all scheduled media programming or at least some subset of available media programming. In some embodiments, a voting window ends before a program starts. Alternatively or in addition, a voting window can extend beyond a program start to allow demand data to be captured during a scheduled program.

In at least some embodiments, an election or voting event is responsive to a trigger. A trigger can include, without limitation, demand exceeding available capacity, demand changing based on user mobility, demand changing based on user activity, network conditions, network activity, e.g., other wireless users, such as voice users, data users and so on.

In at least some instances, demand can be determined at least in part by trends. Trends can be determined based on prior demand, e.g., prior consumption or usage, and/or anticipated or predicted demand.

It is understood that allocation and/or reallocation of broadcast/multicast resources can be accomplished in advance of pre-scheduled program content. Accordingly, broadcast/multicast resources can be allocated according to a scheduled that may be determined at least in party by consumer demand. Alternatively or in addition, broadcast/multicast resources can be allocated and/or reallocated during streaming of a media content item. For example a program with relatively low demand may be distributed via unicast, whereas a program with a relatively high demand may be distributed via broadcast/multicast. To the extent demand changes during the program, it is understood that reallocation of broadcast/multicast resources can occur.

Reallocations can be based on one or more of relative demands of other programs and/or bandwidth allocations. In some embodiments, allocations of available multicast/broadcast channels is based on actual and/or anticipated bandwidth efficiency. Bandwidths, e.g., frequency bands, time slots and/or resource block allocations can be calculated and/or otherwise determined for one or more streaming media items. Comparisons can be determined based on demand, whether one program over another will result in a more efficient usage of wireless capacity.

For example, as demand increases for a program originally distributed via unicast, a media delivery system may reallocate the program to a broadcast/multicast distribution. Likewise, as demand decreases for another program originally distributed via broadcast/multicast, the media delivery system may reallocate the program to a unicast distribution. In at least some embodiments, such reallocations between unicast and broadcast/multicast can occur without intervention by a mobile user, e.g., occurring seamlessly in the background. However, as certain changes may affect data charges, it is envisioned that at least some changes may be accompanied by a notice to the mobile user and/or a requirement that a mobile user accept such a change. In at least some embodiments, demand is further based on user acceptance and/or rejection of such changes in broadcast/multicast content.

It is further understood that demand is subject to change. For example, as different users become active in any given period, demand of a population of media consumers in a particular geographic region served by a mobile service provider will change. Likewise, active users may choose to select different media content during the same active period, e.g., selecting different programs according to a program lineup of a service provider, personal likes/dislikes, etc. Other contributors to changing demand can include mobility of content consumers. For example, content consumers leaving one cell and/or sector and entering another cell and/or sector will result in changes to the populations of content consumers in each of the cells and/or sectors.

Allocation of limited broadcast and/or multicast resources can be established within a media delivery system to associate broadcast/multicast channels with media content or programs that are most demanded. It is expected that demand based allocation of broadcast/multicast would offload a greater number of individual data sessions to broadcast/multicast sessions, resulting in a more efficient usage of limited spectral resources.

In connection with such a system, at least some users may travel between various geographical areas, e.g., management areas for the management and coordination of streaming media cellular broadcast. Such a change in user population within one or more management areas, e.g., cells and/or sectors at any given time can impact demand. For example, if a user consuming a particular broadcast program moves from a first management area to a second management area, the user's associated demand can be reconsidered in a reallocation of broadcast/multicast resources of the cell and/or sector being entered and/or the cell and/or sector being exited.

The nature of some media programs is such that it may be limited to use or usefulness in a given geographical area. Examples of the present disclosure identify and control the media programs delivered and made available to the mobile endpoint devices that are moving through various locations and from cell site to cell site. Specific media program selection and availability are managed as part of operationalizing these types of delivery systems.

In a streaming cellular broadcast delivery system, users may travel from one management area to another management area. For example, a management area can be a large geographical area such as a large metropolitan area or geographical viewing market or smaller, sub-divided geographical areas such as local neighborhoods, cities, counties, states, or any division. In one embodiment, the smallest management area in consideration with respect to the present disclosure is a cell site, (e.g., the coverage area of a single cellular base station). Thus, a management area may include from one to many cell sites and/or base stations. In addition, the available content streams, or media programs, may vary based upon the management area, the demands, trends and/or preferences of users in the management area, and the demands, trends and/or preferences of users who may enter the area or who may leave the management area. Notably, a base station has limited radio frequency (RF) resources available for streaming media cellular broadcast use. As such, in one example, a limited maximum number, e.g., up to 15-20 media programs may be selected for streaming media cellular broadcast via each base station (or management area comprising multiple base stations). Thus, examples of the present disclosure select which content to fill the available broadcast and/or multicast slots at each base station. In addition to the demands, trends and/or preferences of users who are in a management area, users who may enter the management area, or users who may leave the management area, the decision of what streams to offer to which subscribers in which areas may be further based upon: device capabilities, geographic entitlement, services purchased, system demands and capabilities, and so forth.

To illustrate, in the Philadelphia area, there may be a strong demand (anticipated and/or actual, aggregated over a large number of users) for streaming media cellular broadcast of a game being played by a Philadelphia-based professional sports team. Moving away from Philadelphia, there may still be a strong demand for this program, but further south approaching Baltimore, there may be a stronger demand for a game being played at the same time by a Baltimore-based professional sports team. Nevertheless, there may be enough users travelling from Philadelphia toward Baltimore and beyond that the game of the Philadelphia-based team may still be selected as one of the 15-20 streaming media cellular broadcast channels in parts of the Baltimore area (or at least for cellular base stations and/or management areas that cover major travel routes through the region). However, moving further south towards Washington, D.C., there may be far fewer users interested in the game of the Philadelphia-based team such that this game is not selected for streaming media cellular broadcast. Instead, there may be a game of a Washington, D.C.-based sports team, as well as possibly the game of the Baltimore-based sports team, that are made available via streaming media cellular broadcast, in addition to news programming, other types of arts and entertainment programming, and so forth.

The media programs that are made available via streaming media cellular broadcast may be live or pre-recorded content. In addition, the media programs may be simultaneously broadcast via the over-the-air television and/or cable/satellite broadcast systems. However, in another example, any one or more of the media programs may comprise content that is not generally available as "live" content via these other systems. In addition, the streaming media cellular broadcast system of the present disclosure may utilize centralized or distributed devices for media program selection in one or more management areas. The media program selection may use data regarding: the current users in a management area, the users who are anticipated to be entering or leaving a management area (e.g., based upon a movement or a trajectory revealed via Global Positioning System (GPS) location information or serving base station information), users' origin/home areas, the types of media programs that users in the home areas typically watch, and/or the types of content that users in the home areas more specifically prefer to access via streaming media cellular broadcast. In one example, content selection units may also utilize anonymized individual user viewing preferences for users who may be in a management area, or who may be entering or leaving a management area.

In one example, the content selection may utilize current demand data, i.e., what users are currently viewing via streaming media cellular broadcast as the users are travelling from management area to management area. For instance, multiple factors may be considered in selecting one particular media program versus another for inclusion in a limited set of media programs being broadcast via each cell site and/or management area. In addition, in one example, current viewing data of individual users may be weighted more heavily as compared to the data regarding viewing preferences of a typical user from a user's home/origin area or data regarding individual user profiles.

In one example, the content selection may also account for trends in the level(s) of aggregate demand for one or more media programs. For instance, in a management area somewhere approximately between Philadelphia and Baltimore, 4,000 users may currently be watching the game of the Philadelphia-based team and 1,000 users may currently be watching the game of the Baltimore-based team. However over time, the actual viewership of the game of the Philadelphia-based team may decline from 4,000 down to 3,000 (and anticipated to decrease further) while the demand for the game of the Baltimore-based team may increase from 1,000 to 2,500 (and anticipated to increase further). In this case, since the system is bandwidth and broadcast channel limited at each base station, the trend data can be used to make sure that the game of the Baltimore-based team will become more available while the game of the Philadelphia-based team may be more likely to give way to other media programs with higher demand, or increasing demand, if demand for the game of the Philadelphia-based team continues to decline further.

Notably, selection of media programs is performed with respect to all users in a management area over time. Examples of the present disclosure also account for users who are travelling and the types of media programs they are instantaneously consuming. For instance, examples of the present disclosure consider where a user is coming from (e.g., decreasing demand for certain content associated with a user in a management area the user is leaving) and where the user are going (e.g., increasing demand for certain content associated with the user in a management area the user is entering). These and other aspects of the present disclosure are discussed in greater detail below in connection with the examples of FIGS. 1-7.

To better understand the present disclosure, FIG. 1 illustrates an example network, or system 100 that may implement embodiments of the present disclosure for determining a demand and/or a trend, and selecting media programming for broadcast via a broadcast and/or multicast channel of a base station based upon the demand and/or trend. In one example, the system 100 includes a telecommunications service provider network 105. The telecommunications service provider network 105 may comprise a cellular network 110, a service network 140, and an IP Multimedia Subsystem (IMS) network 150. The system 100 may further include other networks 170 connected to the telecommunications service provider network 105. Endpoint devices 160 and 161 may each comprise a cellular telephone, a smartphone, a tablet computing device, a laptop computer, a pair of computing glasses, a wireless enabled wristwatch, or any other cellular-capable mobile telephony and computing device (broadly, a "mobile endpoint device"). In one example, the endpoint devices 160 and 161 may communicate with cellular network 110 using multiple cellular communication technologies, such as GSM/time-division multiple access (TDMA) communications, wideband code division multiple access (WCDMA), CDMA2000 communications, orthogonal frequency division multiple access (OFDMA), and the like over various frequency bands.

In one example, the cellular network 110 comprises an access network 120 and a core network, in this example a converged network 130, e.g., a cellular core network with components for 2G-4G and beyond architectures, e.g., 5G. For example, as illustrated in FIG. 1, the access network 120 may include a Universal Mobile Telecommunications System (UMTS) terrestrial radio access network (UTRAN) portion, an evolved UTRAN (eUTRAN), and a base station subsystem (BSS), e.g., a Global System for Mobile communication (GSM) radio access network (GRAN), while the converged network 130 may include evolved packet core (EPC) network components, and network switching subsystem (NSS)/GSM core network and/or General Packet Radio Service (GPRS) core network components. For example, the base stations 121, 122, and 123 may each comprise a base transceiver station (BTS), a NodeB, and an eNodeB. In other words, the base stations 121-123 may each comprise a cell site with 2G, 3G, and 4G/LTE components. As illustrated in FIG. 1, access network 120 further includes a base station controller (BSC)/radio network controller (RNC) 125, which may perform a variety of wireless network management related tasks such as wireless channel assignments, determining transmission power levels, controlling handovers from one base station to another base station (e.g., for sessions using 2G and/or 3G infrastructure), concentrating multiple signals from endpoint devices for onward transmission to other portions of the access network 120, or the converged network 130, and to perform other functions. In the present example, the BSC/RNC 125 may coordinate 2G and 3G communications such as GSM/TDMA communications, WCDMA or CDMA2000 communications, and the like via the base stations 121-123.

In one example, each of the base stations 121-123 may have an associated media coordination unit (MCU) 191-193. The MCUs 191-193 may receive manifest files (or control data that is used to create manifest files) and media programs, and may re-broadcast the manifest files and media programs via RF broadcast channels of the respective base stations 121-123, as described in greater detail below. In one example, each of the MCUs 191-193 may comprise a computing system, such as the computing system 300 depicted in FIG. 3, specifically configured to perform various steps, functions, and/or operations in connection with examples of the present disclosure for broadcasting a media program via a broadcast channel of a base station based upon a level of aggregate demand.

In one example, the converged network 130 provides various functions that support wireless services in the 2G-4G/LTE environment. For instance, the network devices Mobility Management Entity (MME) 132 and the Serving Gateway (SGW) 134 provide various functions for LTE-based communications. For example, the MME 132 is the control node for the LTE access networks, such as eUTRAN portions of the access network 120 (e.g., eNodeBs). In one embodiment, the MME 132 is responsible for user equipment (UE)/mobile endpoint device tracking and paging (e.g., such as retransmissions), bearer activation and deactivation process, selection of the SGW, e.g., SGW 134, and user authentication. In one embodiment, the SGW 134 routes and forwards user data packets, while also acting as the mobility anchor for the user plane during inter-eNodeB handovers and as the anchor for mobility between LTE and other wireless technologies, such as 2G and 3G network portions. For LTE-based communications, the converged network 130 may also include a Home Subscriber Server (HSS) 136 that contains subscription-related information (e.g., subscriber profiles), performs authentication and authorization of a wireless service user, and provides information about the subscriber's location. The converged network 130 may also comprise a packet data network (PDN) gateway 138 which serves as a gateway that provides access between the converged network 130 and various data networks, e.g., the service network 140, the IMS network 150, networks 170, and the like. The packet data network gateway 138 is also referred to as a PDN gateway, a PDN GW or a PGW. In one example, the LTE/EPC portions of the converged network 130 may comprise an Internet Protocol (IP)/multi-protocol label switching (MPLS) backbone that supports both real-time and non-real-time service delivery.

As mentioned above, converged network 130 may also include NSS/GSM core network and/or GPRS core network components. For example, converged network 130 may include one or more mobile switching centers (MSCs) for each wireless access network that forms part of the system 100, such as MSC 182 for access network 120. The converged network 130 may further include one or more home location registers (HLRs), such as the HLR 186, which functions as a central repository of authentication and service validation information, subscription information, and other information pertaining to user subscriptions and services. Similarly, respective visiting location registers (VLRs) may be integrated within each MSC, and may function as temporary repositories of authentication and service validation information, subscription information, and other information pertaining to visiting user subscriptions and services when an endpoint device is located in a particular geographic region serviced by a particular MSC/VLR. For example, the MSC 182 may be designated to serve and administer a first coverage area including access network 120. Thus, the MSC 182 may maintain, e.g., in a VLR, user profile records for endpoint devices currently serviced by base stations within the portion of the network that is the responsibility of MSC 182 (e.g., endpoint device 160). It should be noted that in one example, a geographic region serviced by a particular MSC/VLR may comprise a management area for streaming media cellular broadcast. However as stated above, in other examples the management area(s) may be of a larger or smaller size.

The converged network 130 may also include GPRS network elements for handling data calls to and from endpoint devices. Such network elements may include a serving GPRS support node (SGSN) 184, a gateway GPRS support nodes (GGSN) 188, and related support components including media servers, application servers, and the like. An SGSN refers to a network node responsible for communicating with endpoint devices and routing of data calls. Similar to the MSC 182, the SGSN 184 may have specific coverage areas and be assigned to handle specific wireless access networks of the system 100. A GGSN refers to a network node responsible for the interworking between a GPRS network (e.g., components of the converged network 130 that support GPRS services and functionality) and external packet switched networks, e.g., service network 140, the IMS network 150, and the networks 170. Thus, FIG. 1 illustrates various connections between the GGSN 188 and other components of the system 100. In one example, the GPRS portions of the converged network 130 may comprise an IP/MPLS. In addition, the converged network 130 may include various links and interfaces between 2G/3G components and 4G/LTE components for coordination of various services. For instance, connections between the MME 132 and the MSC 182 and between the PDN GW 138 and the GGSN 188 are shown in FIG. 1. For ease of illustration, other connections may exist but are omitted from the example system 100 of FIG. 1.

In one example, the IMS network 150 may include a proxy call session control function (P-CSCF), a serving call session control function (S-CSCF), a billing and traffic (B&T) server, an ENUM (tElephone NUmbering Mapping) server 168, a domain name service (DNS) server, and other components (not shown). In one example, the service network 140 may comprise one or more devices for providing services to subscribers, customers, and or users. For example, the telecommunications service provider network 105 may provide a cloud storage service, web server hosting, and other services. As such, the service network 140 may represent aspects of telecommunications service provider network 105 where infrastructure for supporting such services may be deployed.

In the example of FIG. 1, the converged network 130 may include one or more application servers (AS) 180. In one example, an AS 180 may comprise a computing system, such as the computing system 300 depicted in FIG. 3, specifically configured to perform various steps, functions, and/or operations in connection with determining demand and/or trend data related to media programming, selecting media programming based on the demand and/or trend. In at least some embodiments the AS 180 and/or another AS facilitate broadcasting selected media programs via one or more broadcast channels of a base station, in accordance with the present disclosure. In one example, the converged network 130 may also include a database (DB) 181, e.g., a physical storage device integrated with the AS 180, or attached or coupled to the AS 180, to store various information regarding media streaming services, users, and/or their endpoint devices. For instance, the DB 181 may store media program and metadata regarding the media programs, e.g., information such as the titles, durations, formats, encoding types, ratings, etc., of the media programs. The DB 181 may also store control information related to the broadcasting of media programs from base station sites, e.g., the base stations 121-123 in the access network 120. For instance, control information may include selections of broadcast channels to use to broadcast different media programs via the base stations 121-123 and selections of SSM IP addresses to be associated with the same and different media programs for the various base stations 121-123. In one example, metadata and/or control information relating to media programs may be stored in manifest files that may be retrieved and sent by the AS 180 to the MCUs 191-193. In another example, the AS 180 may retrieve metadata and/or control information relating to media programs from the DB 181 and may generate the manifest files before sending the manifest files to the MCUs 191-193. In still another example, the AS 180 may retrieve metadata and/or control information relating to media programs from DB 181 and may forward the metadata and/or control information to the MCUs 191-193, where the MCUs 191-193 may create respective manifest files to be broadcast at each of the base station sites/base stations 121-123.

The DB 181 may also store data related to demand and/or trend data to support selection of media programming for efficient management of wireless resources based on broadcast and/or multicast distribution of selected media programs. The DB 181 may also store data/information regarding management areas of the cellular network 110, media programs currently being viewed on various endpoint devices, user preferences for media programs, voting results, member affiliations, search terms and/or message traffic, individual user profiles, model user profiles associated with different management areas, current management areas or other location information of various endpoint devices, (geographical) trajectories of endpoint devices, search statistics regarding various media programs, historical viewership information regarding various media programs viewed via cellular broadcast, historical and/or current viewership information regarding various media programs viewed via the over-the-air television and/or cable/satellite broadcast systems, and so forth. In one example, the AS 180 may access such information and utilize such information to calculate levels of demand for different media programs in different management areas, and to determine which media programs are to be broadcast via a limited number of broadcast channels at one or more base stations in one or more management areas of the cellular network 110, in accordance with the present disclosure.

In one example, the network(s) 170 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 170 may include different types of networks. In another example, the other networks 170 may be the same type of network. The other networks 170 may comprise one or more media servers 175, which may be operated by one or more media providers, and which may provide various types of media programs. In one example, the media servers 175 may comprise one or more computing devices for providing media to various recipient devices via media streaming sessions. For instance, the media servers 175 may comprise IP multicast servers for providing streaming media to various recipient devices over various networks which may employ the same or different types of communication technologies. In one example, the media servers 175 may store complementary or redundant copies of the same media programs. Thus, any one or more of the media servers 175 may be selected as a source to stream selected media programs to recipient devices.

In one example, the media servers 175 may broadcast media programs using an IP multicast protocol. For instance, one of the media servers 175 may comprise a source to send a media program to a designated group IP address. Recipient devices may then indicate a desire to receive the media program by sending a join request that indicates the group address. Routers, switches, and other devices in transport paths between the source and various recipient devices may then construct distribution trees which ingest the media program from the source, replicate the media program and transmit copies of the media program toward the recipient devices. Thus, for example, the AS 180 may receive the media program from the one of the media servers 175 by sending a join request indicating the IP group address for the particular media program, where routers, switches, gateways, and the like in one or more networks between the one of the media servers 175 and AS 180 may route the media program to AS 180 (and any other recipient devices that join the group) in response to the join request. The AS 180 may then propagate the media program toward the MCUs 191-193, e.g., via the PDN GW 138 and the SGW 134 (e.g., for 4G/LTE service) and/or via the GGSN 188, the SGSN 184, and the BSC/RNC 125 (e.g., for 2G/3G service). For example, the AS 180 may generate its own IP multicast stream with the MCUs 191-193 sending join requests to join the group associated with the stream, or the AS 180 may unicast the media program to one or more of the MCUs 191-193.

Alternatively, or in addition, the MCUs 191-193 may also send join request indicating the IP group address for the IP multicast stream associated with the media program sourced from the one of the media servers 175. In other words, the MCUs 191-193 may comprise independent recipient devices associated with the media program that may be multicast by the one of the media servers 175. In such an example, the media program may be propagated from the one of the media servers 175 to the PDN GW 138 and/or the GGSN 188 and onward through the converged network 130 and the access network 120 to the respective MCUs 191-193 without the AS 180 serving as a point of re-multicasting. However, in such an example, the AS 180 may still perform management functions related the broadcasting of the media program via RF broadcast channels of the respective base stations 121-123. In any of the foregoing examples, the MCUs 191-193 receive the media program and may then rebroadcast the media program via RF broadcast channels the via base stations 121-123. In this regard, the MCUs 191-193 may receive the media program over 2G/3G infrastructure or via 4G/LTE infrastructure, and may rebroadcast the media program via NodeB portions of the base stations 121-123, respectively, or via eNodeB portions of the base stations 121-123, respectively.

In accordance with the present disclosure, the cellular network 110 may be divided into different management areas comprising one or more base stations/cell sites. For instance, in the example of FIG. 1, a first management area may comprise base stations 121 and 122, while a second management area may comprise base station 123. In one example, the AS 180 may access information from the DB 181, such as data/information regarding management areas of the cellular network 110, media programs currently being viewed on various endpoint devices, individual user profiles, user preferences, current and/or historical user media consumption selections and/or preferences, search terms, affiliations, information obtained from other applications, e.g., social media, model user profiles associated with different management areas, current management areas or other location information of various endpoint devices, (geographical) trajectories of endpoint devices, search statistics regarding various media programs, historical viewership information regarding various media programs viewed via cellular broadcast, historical and/or current viewership information regarding various media programs viewed via the over-the-air television and/or cable/satellite broadcast systems, and so forth. The AS 180 may then utilize such information to calculate levels of aggregate demand for different media programs in the first management area (base stations 121 and 122) and in the second management area (base station 123). In addition, the AS 180 may determine which media programs are to be broadcast via a limited number of broadcast channels at the base stations in the respective first management area and second management area based upon the levels of aggregate demand, in accordance with the present disclosure. For instance, the AS 180 may perform various operations that are described in greater detail below in connection with one or more of the example processes 200 of FIGS. 3B-3E.

In one example, the AS 180 may select media programs to be broadcast via the available broadcast channels and may notify the base station(s) and/or the MCU(s) accordingly. For instance, the AS 180 may send control plane communications to and receive control plane communications from the base stations 121-123 and/or the associated MCUs 191-193 to determine available RF resources, such as OFDMA resource blocks. In one example, for a particular media program, and for a particular one of the base stations 121-123, the AS 180 may select RF resources for the media program to be broadcast and may notify the base station and/or the MCU accordingly. In another example, the AS 180 may select the media programs to be broadcast via the broadcast channels of base stations of the respective management areas, but the selection of the actual broadcast channels/RF resources is left to other devices, such as the base stations 121-123, the BSC/RNC 125, or the like.

As described above, the base station and/or the associated MCU may receive the media programs via a variety of paths through the system 100. In any event, the one of the base stations 121-123 and/or the one of the associated MCUs 191-193 may then rebroadcast the media programs via the selected RF resources. In another example, the AS 180 may communicate with the MME 132 and/or the MSC 182 to indicate an intent to broadcast one or more media programs via the base stations 121-123. In turn, the MME 132 and/or the MSC 182 may then communicate with base stations 121-123, the MCUs 191-193, and/or the BSC/RNC 125 to determine available RF resources of the respective base stations 121-123, to select RF resources for broadcasts of various media programs and to instruct the respective base stations 121-123, the MCUs 191-193, and/or the BSC/RNC 125 to utilize the RF resources that are selected for the respective media programs.

In addition, as described above, the MCUs 191-193 may be provided with or may generate manifest files associated with media programs that are being broadcast or that is to be broadcasted via the base stations 121-123, respectively. For example, for one of the base stations 121-123, a manifest file may include identification(s) of the media program(s) (e.g., one or more live audio or video programs) and one or more source specific multicast (SSM) IP addresses associated with the one or more live audio or video programs. In one example, the manifest file may include additional information for each media program, such as a duration of the media program, a rating of the media program, a formatting and/or an encoding of the media program, and so on. In one example, the respective manifest files may be broadcast via one or more dedicated control channels of the base stations 121-123. For example, the one or more dedicated control channels may be designated in advance, and may be known by endpoint devices such that endpoint devices may obtain manifest files via the relevant control channel(s). For instance, in one example, endpoint devices 160 and 161 may determine the relevant control channel(s) to receive manifest files via out-of-band communications with AS 180, MME 132, and/or MSC 182. In one example, the control channel(s) for broadcasting manifest files may be selected by the AS 180, the MME 132 and/or the MSC 182 in the same or in a similar manner as described above in connection with the selection of RF resources for broadcasting the actual media program.

The endpoint devices 160 and 161 may receive the manifest files from one or more of the base stations 121-123 and may then present information regarding available media programs for the users of such devices. For instance, the endpoint devices 160 and 161 may present titles, start and end times, durations, ratings, short descriptions, and so forth pertaining to the media programs that are identified in the manifest file(s). The endpoint devices 160 and 161 may present the information via a display screen or via audio output. The endpoint devices 160 and 161 may also receive selections of media programs from users and/or applications of the endpoint devices. For instance, a user of endpoint device 160 may select media program "X" which is indicated to be broadcast. In response to such a selection, the endpoint device 160 may retrieve a SSM IP address of the selected media program from the manifest file obtained from one of the base stations 121-123. For instance, the endpoint device may select the SSM IP address from the manifest file of the one of the base stations 121-123 that is the closest to the endpoint device 160 or that presents the highest signal-to-noise ratio, or based upon a similar criteria. In one example, the endpoint device may send a "subscribe" request that includes the SSM IP address assigned to the media program in order to subscribe to the particular media program.

The "subscribe" request may be sent to the one of the base stations 121-123, the MMUs 191-193, the MME 132, the MSC 182, or the AS 180, depending upon the particular architecture or network configuration and depending upon which component is responsible for the selection and/or the assignment of RF resources to the media programs. In response to the "subscribe" request, one of the base stations 121-123, the MMUs 191-193, the MME 132, the MSC 182, or the AS 180 may then determine the RF resources of the one of the base stations 121-123 on which the media program associated with the SSM IP address is being broadcast, and may send a response indicating to the endpoint device 160 the particular RF resources on which the media program is being broadcast via the one of the base stations 121-123.

In one example, any one or more devices receiving the "subscribe" request may verify that the endpoint device 160 is permitted to receive the media program. For instance, certain media programs may be restricted to certain subscribers, e.g., based upon whether the subscriber has paid to receive the media program(s), based upon an age of the subscriber, etc. For instance, a parent that owns an endpoint device, e.g., a subscriber, may indicate to the cellular network 105 that the endpoint device 161 is for use by the subscriber's child and should not receive media programs via cellular broadcast. Thus, a "subscribe" request from such a device may be denied. In one example, the response may include an encryption key or the like to allow the endpoint device 160 to access the media program(s), e.g., when the subscriber and/or the endpoint device is authorized to receive the media program(s) that are broadcast. The endpoint device 160 may then tune the RF resources identified, receive a media program that is broadcast via the RF resources, and present the media program at the endpoint device 160.

In one example, the device receiving the "subscribe" request may forward a notification of the "subscribe" request to the AS 180, which may store the information regarding "subscribe" request in the DB 181. In one example, the AS 180 may further retrieve this information from the DB 181 for use in determining a level of aggregate demand in the first management area and/or the second management area for the particular media program that is the subject of the "subscribe" request.

The system 100 may also provide for continuity of an endpoint device receiving a media program as the endpoint device moves from one location to another, or as the radio environment changes. For example, endpoint device 160 may obtain different manifest files from each of the base stations 121-123. The same media program may be identified in the different manifest files, but may have a different SSM IP addresses associated with the media program. In addition, the different RF resources may be utilized for broadcasting the same media program via different ones of the base stations 121-123. To illustrate, the endpoint device 161 may receive a media program via a first set of RF resource blocks from the base station 121. However, the endpoint device 161 may be moving toward the base station 122, such that a received signal strength indicator (RSSI), or the like, of the base station 122 may increase to the point that the RSSI of the base station 122 becomes greater than the RSSI of the base station 121. At this time, the endpoint device 161 may send a "subscribe" request that includes the SSM IP address assigned to the media program with respect to the base station 122. The "subscribe" request may be sent to the base station 122, the MMU 192, the MME 132, the MSC 182, or the AS 180, depending upon the particular architecture or network configuration and depending upon which component is responsible for the selection and/or the assignment of RF resources to the media program. In response to the "subscribe" request, the base station 122, the MMU 192, the MME 132, the MSC 182, or the AS 180 may then determine the RF resources of the base station 122 on which the media program is being broadcast, and may send a response indicating to the endpoint device 161 the particular RF resources on which the media program is being broadcast via the base station 122. The endpoint device 160 may then tune to the RF resources identified, and continue to receive the media program via the RF resources of the base station 122. A similar process may be followed as the endpoint device 161 moves away from the base station 122 toward the base station 123.

In one example, the response may further include an encryption key to allow the endpoint device 161 to access the media program via the base station 122. For instance, it may first be verified whether the endpoint device 161 is authorized to receive the media program via the base station 122, and if so, the encryption key may be provided in the response. Notably, even though the endpoint device 161 may be authorized to receive the media program via the base station 121, it may not automatically be the case that the endpoint device 161 is also authorized to receive the media program via the base station 122. For example, some content may have a geographic restriction such that an endpoint device is not permitted to receive the media program when outside of a particular area, notwithstanding that other endpoint devices may be permitted to receive the same media program outside of such an area. In addition, such geographic restrictions may or may not be coterminous with management areas of the cellular network 110.

In the example of FIG. 1, and as described above, the cellular network 110 may include at least a first management area comprising the base stations 121 and 122, and a second management area comprising the base station 123. In one example, the AS 180 may track the locations and trajectories for endpoint devices, including the endpoint devices 160 and 161. The locations may be tracked by receiving GPS location information of endpoint devices at the AS 180, or by the AS 180 subscribing to location data of the endpoint devices which are tracked and stored by another component of the cellular network 110, such as the HSS 136, the MME 132, etc. The trajectories may be calculated from changing location information of an endpoint device over time. In one example, the trajectories of endpoint devices may be determined by maintaining an adjacency graph of nodes comprising base stations/cell sites, and determining that an endpoint device may enter any cell site that is adjacent to the current cell site, for instance. In one example, a distinction may be made for endpoint devices that are determined to be in motion, versus those that are stationary. In other examples, trajectories of endpoint devices may be determined in various other ways, such as endpoint devices estimating their own directions of movement and velocities, and reporting such information to the AS 180 and/or other components of the cellular network 110. When a trajectory indicates that an endpoint device will be leaving one management area and entering another, the AS 180 may update calculations of aggregate demand for different media programs in the respective management areas. Further details regarding such operations are described in greater detail below in connection with the example processes 310, 320, 330, 340 of FIGS. 3B-3E.

It should be noted that the system 100 has been simplified. In other words, the system 100 may be implemented in a different form than that which is illustrated in FIG. 1. For example, the system 100 may be expanded to include additional networks, such as network operations center (NOC) networks and additional access networks, as well as additional base stations, management areas, and so forth. The system 100 may also be expanded to include additional network elements such as border elements, routers, switches, policy servers, security devices, gateways, a content distribution network (CDN), and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For instance, in one example, the MCUs 191-193 may be integrated within the respective base stations 121-123. Similarly, although the AS 180 and the DB 181 are illustrated as components of the service network 140, and the media servers 175 are illustrated as components within the networks 170, in other examples, any one or more of these components may be deployed in a different configuration. For example, the AS 180 and the DB 181 may be deployed within the IMS network 150, within the converged network 130, within the access network 120, and so on.

In addition, FIG. 1 illustrates a single AS 180 (and DB 181) that is described as being configured to perform various steps, functions, and/or operations in connection with broadcasting a media program via a broadcast channel of a base station based upon a level of aggregate demand, in accordance with the present disclosure. In particular, the AS 180 is described as performing operations for managing streaming media cellular broadcast in the first management area comprising the base stations 121 and 122 as well as in the second management area comprising the base station 123. However, in another example, the first management area and the second management area may have separate "management" devices (and respective databases) for performing the same or similar operations as the AS 180. In such an example, the respective management devices may communicate with one another to share various types of information regarding the respective management areas, and the users and/or mobile devices associated with the management areas. For instance, a first management device of the first coverage area may share information regarding what media program is currently tuned to by the endpoint device 160 (e.g., as the endpoint device 160 is detected to be leaving the first management area and entering the second management area by either the first management device or a second management device of the second coverage area). Similarly, in another example, any one or more of the MCUs 191-193 may be configured to perform various steps, functions, and/or operations in connection with broadcasting a media program via a broadcast channel of a base station based upon a level of aggregate demand, e.g., as an alternative or in addition to AS 180. For instance, the MCU 191 may perform operations for managing streaming media cellular broadcast for the first management area comprising the base stations 191 and 192, while the MCU 193 may perform operations for managing streaming media cellular broadcast for the second management area comprising the base station 123.

In addition, various elements of the access network 120, the converged network 130, and the IMS network 150 are omitted for clarity, including gateways or border elements providing connectivity between such networks, internal routers within the converged network 130, and so on. Similarly, due to the relatively large number of connections available between devices in the system 100, various links between the MME 132, the SGW 134, the base stations 121-123, the MCUs 191-193, the SMSC 180, the PDN GW 138, the SMSG 180, and other components of system 100 are also omitted for clarity. Moreover, although aspects of the present disclosure have been discussed above in the context of a converged network with GSM/TDMA-based, GPRS/CDMA-based, and LTE/OFDMA-based components, examples of the present disclosure are not so limited. For example, the teachings of the present disclosure can be applied to networks and systems that use other types of wireless/cellular technologies, such as enhanced data rates for GSM evolution (EDGE), IS-95, or a future technology or standard-based network, e.g., a 5G network, and so forth. Similarly, although aspects of the present disclosure have been discussed above in the context of SSM IP streaming media cellular broadcast, in other, further, and different examples, other types of cellular broadcast technologies may be utilized. Thus, these and other modifications are all contemplated within the scope of the present disclosure.

Figure 2:
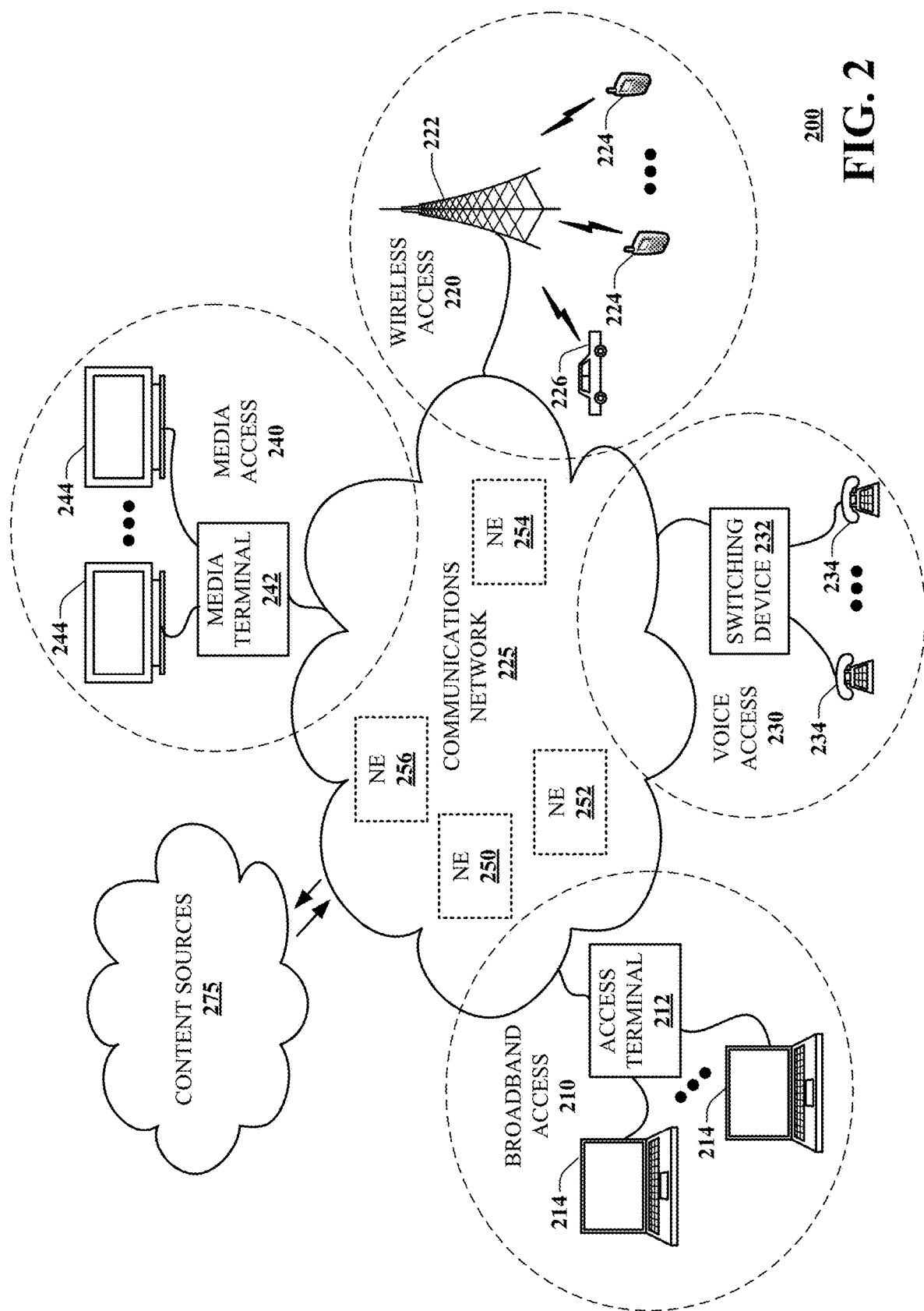
FIG. 2 is a block diagram illustrating another example, non-limiting embodiment of a communications network in accordance with various aspects described herein.

Referring now to FIG. 2, a block diagram is shown illustrating an example, non-limiting embodiment of a communications network 200 in accordance with various aspects described herein. In particular, a communications network 225 is presented for providing broadband access 210 to a plurality of data terminals 214 via access terminal 212, wireless access 220 to a plurality of mobile devices 224 and vehicle 226 via base station or access point 222, voice access 230 to a plurality of telephony devices 234, via switching device 232 and/or media access 240 to a plurality of audio/video display devices 244 via media terminal 242. In addition, communication network 225 is coupled to one or more content sources 275 of audio, video, graphics, text and/or other media. While broadband access 210, wireless access 220, voice access 230 and media access 240 are shown separately, one or more of these forms of access can be combined to provide multiple access services to a single client device (e.g., mobile devices 224 can receive media content via media terminal 242, data terminal 214 can be provided voice access via switching device 232, and so on).

The communications network 225 includes a plurality of network elements (NE) 250, 252, 254, etc. for facilitating the broadband access 210, wireless access 220, voice access 230, media access 240 and/or the distribution of content from content sources 275. In some embodiments, one or more of the network elements can include a stream selector 256 supporting a stream selection function. For example, the stream selector 256 determines demand and/or trend data for one or more wireless access territories or cells. The stream selector 256 can be adapted to implement all or at least portions of one or more of the stream selection processes disclosed herein, such as those processes 310, 320, 330, 340, disclosed in FIGS. 3B-3E.

The communications network 225 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 212 can include a digital subscriber line access multiplexer (DSLAM), cable modem termination system (CMTS), optical line terminal (OLT) and/or other access terminal. The data terminals 214 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 222 can include a 4G, 5G, or higher generation base station, an access point that operates via an 802.11 standard such as 802.11n, 802.11ac or other wireless access terminal. The mobile devices 224 can include mobile phones, e-readers, tablets, phablets, wireless modems, and/or other mobile computing devices.

In various embodiments, the switching device 232 can include a private branch exchange or central office switch, a media services gateway, VoIP gateway or other gateway device and/or other switching device. The telephony devices 234 can include traditional telephones (with or without a terminal adapter), VoIP telephones and/or other telephony devices.

In various embodiments, the media terminal 242 can include a cable head-end or other TV head-end, a satellite receiver, gateway or other media terminal 242. The display devices 244 can include televisions with or without a set top box, personal computers and/or other display devices.

In various embodiments, the content sources 275 include broadcast television and radio sources, video on demand platforms and streaming video and audio services platforms, one or more content data networks, data servers, web servers and other content servers, and/or other sources of media.

In various embodiments, the communications network 225 can include wired, optical and/or wireless links and the network elements 250, 252, 254, 256, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Multicast technologies may include any technologies for transmitting data for a set of destinations. Many techniques described herein are described with respect to unicast and broadcast technologies in general or with respect to particular unicast and broadcast technologies. However, techniques are generally applicable to a wide variety of transport types. For example, techniques may be applicable to an IP multicast arrangement in which a receiver elects to receive packets. As another example, techniques may be applicable to a broadcast arrangement in which a receiver can tune into a particular frequency or other content source to receive data. Accordingly, transport types such as multicast may be alternatives to broadcast or unicast or may be included within the scope of broadcast or unicast, depending on the particular technologies or network being used.

Hypertext Transfer Protocol (HTTP) unicast streaming is a convenient mechanism for distributing both media content such as near-live streaming video and video clip content. Individual streams are selected and transported to each user. In contrast to progressive download, media content is partitioned into fragments or segments that are delivered as separate files or byte-ranges of a bigger file. A variety of fragment streams can be encoded at different quality levels to allow selection among variants in near real-time. The uniform resource locators (URLs) of the segments are typically provided in a manifest file which either contains a template URL pattern or an explicit list of segment URLs. Fragment-based streaming can leverage existing HTTP servers and content delivery network (CDN) networks and cause considerably fewer problems with firewalls compared to RTP streaming. There is therefore a trend of moving away from Real Time Streaming Protocol/Real-time Transport Protocol (RTSP/RTP)-based streaming towards HTTP streaming. Strong efforts in this direction include HTTP Live Streaming (HLS) and 3GPP's and MPEG's DASH (Dynamic Adaptive Streaming over HTTP).

RTP-based multicast streaming over broadcast networks remains prevalent in particular environments. 3GPP's Multimedia Broadcast Multicast Services (MBMS) standard has relied on RTP-based streaming for video distribution. In addition, there is a download/file-distribution mode in MBMS using the File Delivery over Unidirectional Transport (FLUTE) protocol, still using IP multicast. Example use cases for this include distribution of electronic program guide data and data files, such as sports statistics. With the introduction of MBMS in 4th generation cellular LTE networks, interest in MBMS is increasing, particular in a rendition referred to as "eMBMS". The live video distribution mechanism using RTP is still in the standard, but eMBMS allows MBMS to distribute video and other continuous media using DASH-compatible media and metadata packetization. There is thus a means for broadcast distribution of DASH in addition to the standard unicast HTTP based distribution of DASH.

Figure 3A:
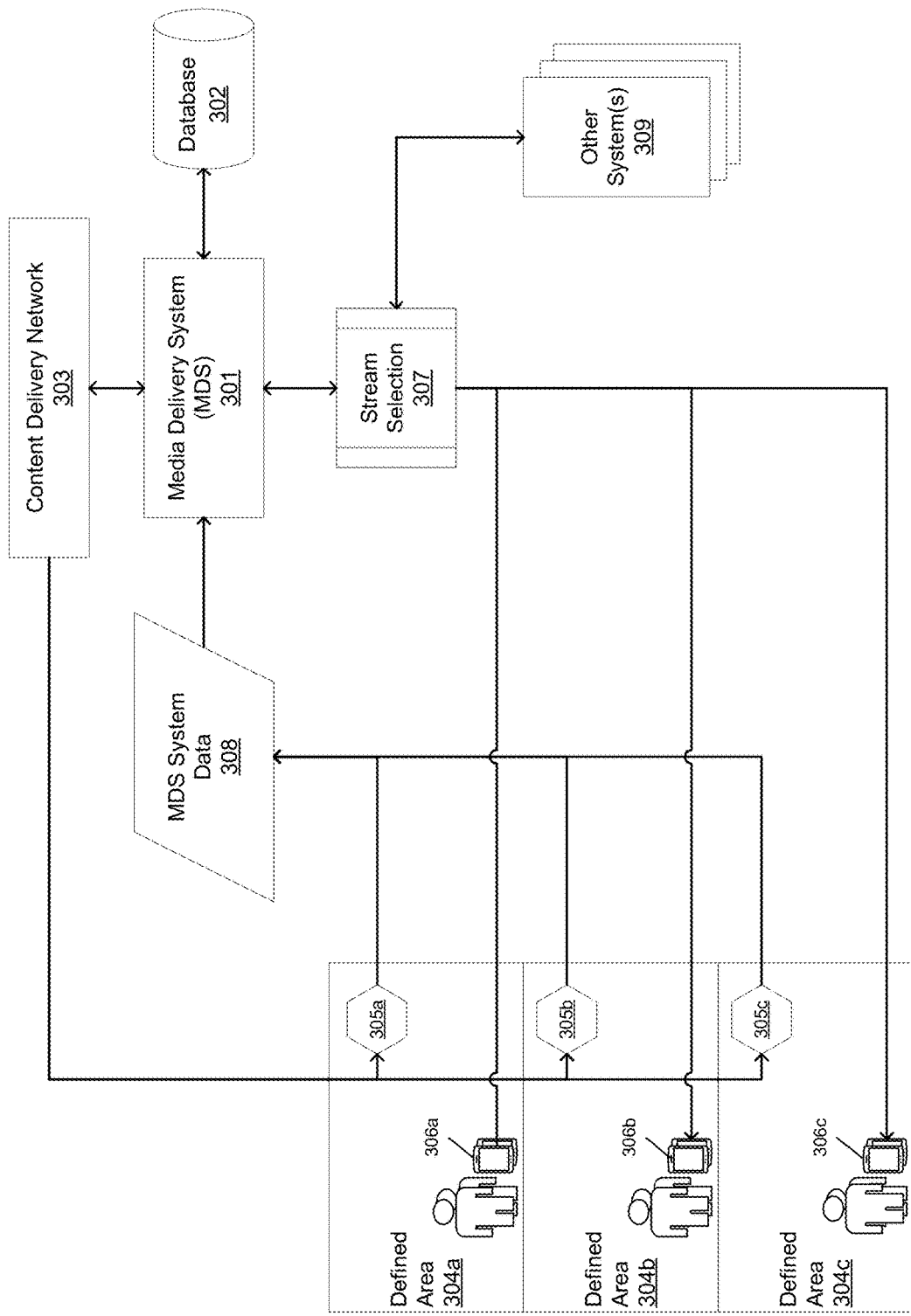
FIG. 3A depicts an illustrative embodiment of communication network adapted to select and distribute media content including streaming media programs in accordance with various aspects described herein.

FIG. 3A depicts an illustrative embodiment of communication network 300 adapted to select and distribute media content including streaming media programs in accordance with various aspects described herein. The communication network includes a media delivery system 301, a database 302 and a content delivery network 303. The media delivery system accesses media content via the database 302 and provides the media content to the content delivery network 303 for delivery to mobile user equipment 306a, 306b, 306c, generally 306. The content delivery network 303 supports wireless distribution of the media content in one or more coverage areas 304a, 304b, 304c, generally 304. Wireless distribution can be accomplished by one or more wireless access points 305a, 305b, 305c, generally 305.

According to the illustrative embodiment, a first coverage area 304a provides wireless service to a first group of user equipment 306a by way of a first wireless access point 305a. Likewise, a second coverage area 304b provides wireless service to a second group of user equipment 306b by way of a second wireless access point 305b, a third coverage area 304c provides wireless service to a third group of user equipment 306c by way of a third wireless access point 305c, and so on. Without restriction, the wireless access points can provide wireless service according to one of a licensed spectrum allocation, e.g., a mobile cellular service, unlicensed spectrum, e.g., WiFi, or some combination of licensed and unlicensed spectrum.

In at least some applications, a wireless service capacity in one or more of the coverage areas 304 is subject to a respective capacity limit. Without restriction, wireless service capacity limits can be subject to finite availability of licensed spectrum accessible by the content delivery network 303 within respective coverage areas 304. It is understood that portions and/or quantities licensed spectrum may be the same or different across the different coverage areas 304. Alternatively or in addition, wireless service capacity limits can be subject to allocations of available licensed spectrum, e.g., portions of the available licensed spectrum allocated for broadcast versus other services, e.g., unicast, operation and maintenance, overhead. It is further understood that at least some user equipment 306 of any one or more of the groups of user equipment can be mobile within and/or across the coverage areas 304. It is conceivable that in at least some scenarios, a user equipment 306 can be within an overlapping coverage area 304 in which the user equipment 306 can access wireless services contemporaneously by more than one of the wireless access points 305.

The media delivery system 301 can access media content from a database 302 and/or from other sources, such as content providers. The media delivery service 301 can make a selection of media content available to the user equipment via the content and provides the media content to the content delivery network 303. User equipment may access one or more media content items of the selection of media content according to one or more techniques including, without limitation, unicast and broadcast, wherein broadcast can include multicast. In a unicast distribution, the media content is effectively provided through dedicated resources, e.g., dedicated resource blocks of a 3GPP Long Term Evolution system to an individual user equipment 306. To the extent more than one user equipment 306 within a common coverage area 304 have requested the same media content item at approximately the same time, separate resources, including separate spectrum resources would be used to service the same content. Broadcast and/or multicast provides an ability to allocate common spectrum resources to multiple user equipment 306.

It is understood that some media content, e.g., that having broad appeal to more than one user, may be suitable for broadcast/multicast distribution. It is also conceivable that other media content and/or mobile services will be dedicated to individual user equipment 306. In order to manage a balance between unicast and broadcast/multicast, the content delivery network can allocate a first portion of its resources, e.g., licensed spectrum or resource blocks to unicast service, and a second portion to a broadcast and/or multicast service. Even if all available resources were allocated to broadcast and/or multicast, there would be some limit to a number of media content items, e.g., programs that could be transferred or otherwise streamed during any given period.

The stream selector 307 selects a group of media content items from the available contents as broadcast and/or multicast content. The stream selector provides an input to the media delivery system 301 to identify the group of media content items selected as broadcast and/or multicast content. The media deliver system 301, in turn, allocates the group of media content items to broadcast and/or multicast distribution channels, e.g., including one or more of resource blocks, frequency bands, time slots, and the like. The content delivery network 303, upon instruction received from the media delivery system 301 associates available broadcast and/or multicast channels with the selected group of media content items. In some embodiments, each defined area 304 includes a respective allocation of media content to broadcast and/or multicast channels based on one or more of available capacity, user demand, network conditions, and so on. It is understood that respective broadcast and/or multicast allocations of different coverage areas 304 may be identical, or different. To the extent there are differences, there may be some overlap, e.g., some media content that is allocated for broadcast and/or multicast on more than one coverage areas. Alternatively or in addition, there may be no overlap, such that no common media content items are broadcast and/or multicast within different coverage areas.

Over time, end users or Content Consumers (CC) of any content delivery system will generate Demand Data (DD) and/or Trend Data (TD). Demand data can captured as it is created by the users. Trend Data can be inferred based on other system data about the users, and/or created externally based on expectations of user demand. Integration of DD and TD into the media delivery system 301 and stream selector components 307 of a network 100, such as a Cellular Broadcast System makes those systems more efficient for the network and more intuitive and attractive for the users.

In at least some embodiments, the stream selector 307 implements a stream selection process. The process can identify and/or estimate consumer demand and make selections of available media content based on the demand. The demand can include identification of media content being consumed by one or more of the groups of user equipment 306. For example, the communication network 300 can include a media delivery system (MDS) data collector 308. The MDS data collector 308 can receive information from one or more of the wireless access terminals 305 that identifies a measure of user consumption. For example, user equipment 306 may consume media content in a context of a mobile application. The mobile application may employ some measure of authorization and/or identification to identify particular user equipment 306 and/or user accounts associated with the user equipment 306. The wireless access terminals 305 may collect media content selections, e.g., in the context of the application, and provide the selections to one or more of the stream selector 307 and the media delivery system 301.

One or more of the stream selector 307 and the media delivery system 301 alone or in combination can process demand data obtained from one or more of the user equipment 306, the wireless access points 305 and the MDS data collector 308. The stream selector 307 and/or the media delivery system 301 and/or the MDS system data 308 can be adapted to implement all or at least portions of one or more of the stream selection processes disclosed herein, such as those processes 310, 320, 330, 340, disclosed in FIGS. 3B-3E. In at least some embodiments, the demand data is used to associate a level of current demand with one or more available media content items or programs. The stream selector 307 can rank order the available programs, e.g., most demanded to least demanded. In some embodiments, a histogram can be applied based on frequency of demand and the like. Alternatively or in addition, demand can be estimated or otherwise predicted based on past demand and/or consumption data. It is understood that various processing techniques can be applied to demand data. For example, statistics can be applied to determine averages, means, modes and/or standard deviations. Alternatively or in addition, algorithms can be applied to determine probabilities of demand at any current instant of time and/or future instant of time.

Usage data can be based on actual usage of available channels. It can be instantaneous and/or temporal. Instantaneous usage data provides a measure, e.g., a "snapshot" of current content usage of a group of users. Temporal usage data can be determined according to a statistical process applied to usage data of a group of users obtained over time. In at least some embodiments, temporal usage can be formed according to an analysis of the instantaneous usage over time and/or derived from other internal or external sources. Preferential demand data can include demand data based on identified and/or predicted or estimated preferences of the content consumers. Preferential demand data may incorporate some trend data as, in practice, there may be some confluence between demand data and trend data.

In at least some embodiments demand data can be based, at least in part, on PDD gathered and/or otherwise concluded from one or more of the internal media delivery systems (MDS) 301, the MDS data 308 and/or associated application search results. Alternatively or in addition demand data can be determined according to data obtained from one or more other systems 309. For example, preferential demand data can be gathered, inferred and/or otherwise concluded from external search systems data when available and/or applicable.

For example, a number of times a media content item is searched within a delivery application, e.g., internal to the media delivery system 301, the search result can be recorded and/or otherwise tabulated for combination with and/or comparison against searches for other media content items. Those search results occurring more frequently, e.g., those with the highest values, can be translated to demand data, which give the highest searched content items a higher weight in an algorithmic use and thus a higher priority as an available stream selected by a stream selection process of the stream selector 307.

It is understood that the any of the techniques for determining demand can be based on particular media content items. Alternatively or in addition, the techniques for determining demand can be based on one or more other factors, such as media content categories and/or genres. For example, movies versus documentaries, or comedies versus sporting events, and so on. Thus demand data for particular media content items can be associated with one or more related factors, such as categories, genres, actors/casts, producers, time periods, e.g., reruns versus new programming, and the like. Likewise, demand data for one or more of the other factors can be associated with available media content items.

In another example, a high frequency of news items being searched or accessed from an external search provider (e.g., Yahoo®, Google®) can be translated into DD such that news programming channels and/or media content items would have a higher weight in an algorithm and thus a higher priority as an available stream according to selection algorithms implemented in one or more of the media delivery system 301 and stream selector 307. In some embodiments, the demand can be associated with specific programs, e.g., ABC Evening News and/or categories, e.g., news in general, national news, local news.

In at least some applications the stream selection processes include solicitation, e.g., vote based data. Vote based data seeks live user input to demand data. Voting data becomes a form of preferential demand data and is used to influence the media delivery system 301. In some embodiments, voting can occur, for example, within a content delivery application or within an external application such as a social media application.

It is understood that voting can be solicited in the form of optional and/or required voting. Voting can be routine, e.g., occurring in a regular and/or ongoing manner, such as in association with a voting window before and/or during a pre-programmed stream. Accordingly, voting is one effective way to provide demand data and establish stream selection resolution to the system.

In some embodiments, voting can be initiated if there is a conflict of availability. For example, such conflicts in a delivery system can result from users moving through different cell areas. Accordingly, user mobility, e.g., cell handoff events, can trigger a vote event. The trigger can include user mobility alone or in combination with changes in demand of cells that may result from user mobility.

In another example, there is similar demand for a number of popular programs greater than the number of available channels in an area of the delivery system, and a vote can be triggered to resolve the contention.

Other examples can use wider cast vote requests to establish popularity data for programs and therefore make wider general selections of available content over time when voting requests data is minimal or not available. Accordingly, voting can be based on individual cells and/or sectors, groups of cells and/or sectors, geographic areas, areas determined according to geopolitical boundaries, arbitrary regions, e.g., according to geometric patterns, demographic regions, neighborhoods. In at least some embodiments, wider cast votes can include an entire network.

Figure 3B:
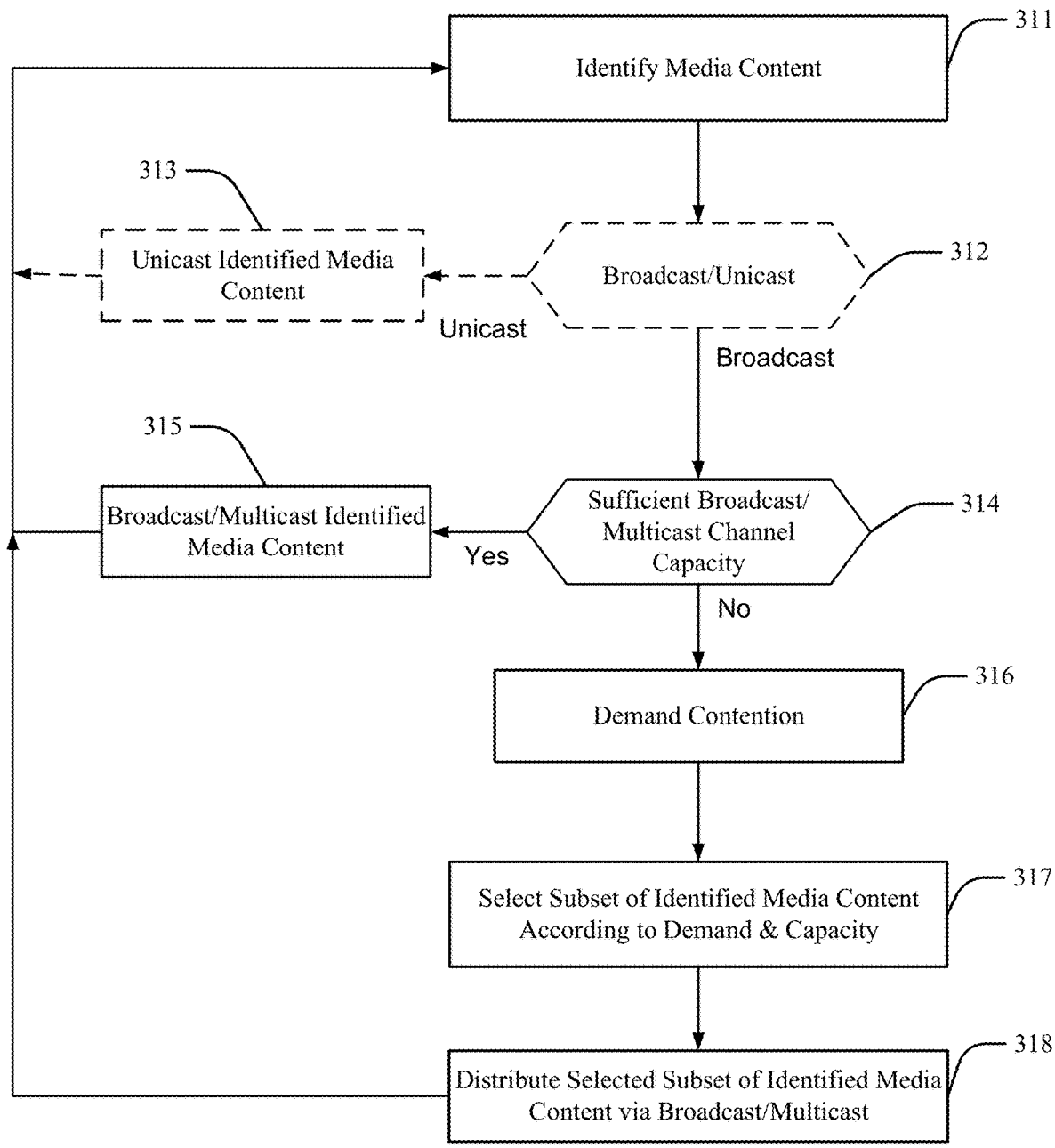
FIG. 3B depicts an illustrative embodiment of a media content selection process in accordance with various aspects described herein.

FIG. 3B depicts an illustrative embodiment of a media content selection process 310 in accordance with various aspects described herein. At step 311, media content is identified. Identified media content can include all media content available to a media service provider. The identified media content can be further limited according to date and/or time, media categories, e.g., streaming audio versus streaming video, subscription levels, e.g., standard, premium, quality, e.g., SD, HD, 4K, program lineups, and so on.

At step 312, a determination can be made as to whether the identified media content should be distributed via unicast or broadcast/multicast. For example, certain programs such as live sporting events, or news, can be associated with a broadcast/multicast distribution as a default. Similarly, some or all content can be associated with unicast as a default. Alternatively or in addition, a stream selector can make a determination as to which media content should be associated with broadcast/multicast service. To the extent it is determined to distribute the media content via unicast, the content is associated with unicast resources at step 313. To the extent it is determined to distribute the identified media content via broadcast/multicast, a determination is made at step 314, as to whether there is sufficient broadcast/multicast channel capacity.

To the extent that there is there is sufficient broadcast/multicast channel capacity, the identified media content is associated with broadcast/multicast resources at step 315. To the extent that there is there is insufficient broadcast/multicast channel capacity, a demand contention process occurs at step 316. Sufficiency of available capacity can be determined according to measured spectral data, calculated and/or estimated usage, or combinations thereof. A subset of the identified media content is selected at step 317, according to results of the demand contention process. The selected subset of media content is associated with broadcast/multicast resources at 318.

It is understood that in at least some embodiments, the media content selection process 310 can be implemented periodically. For example, the process 310 can be implemented according to a schedule, e.g., according to a time schedule, such as weekly, daily, hourly, quarter hourly, and so on. Alternatively or in addition, the process 310 can be implemented according to a program schedule, e.g., at streaming media program start/stop intervals, prior to program schedules and/or during airing of programs. In at least some embodiments, the process 310 can be implemented according to events, such as user mobility, user activity, external events, e.g., weather events, geopolitical events, based on results of a live event, such as a sporting event progress, outcome and/or overtime status, and so on.

Figure 3C:
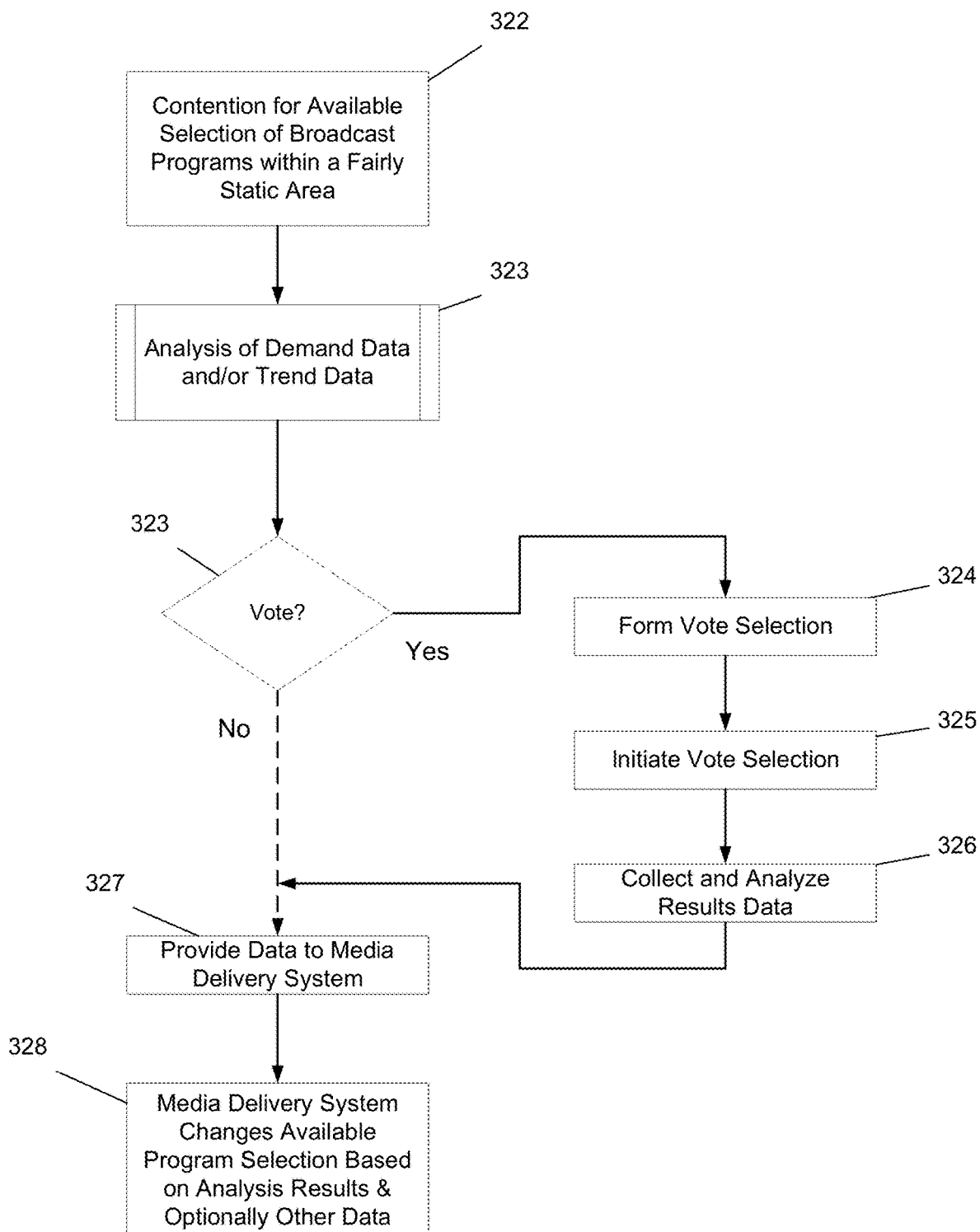
FIG. 3C depicts an illustrative embodiment of a static-user, stream selection process in accordance with various aspects described herein.

FIG. 3C depicts an illustrative embodiment of a demand content process 320, e.g., demand content process 316 (FIG. 3B) in accordance with various aspects described herein. At step 321, a contention for available selection of broadcast programs within a fairly static area is identified. Demand data and/or trend data is analyzed at step 324.

In at least some embodiments, a determination is made at step 323 as to whether a vote is necessary. In at least some embodiments, a determination about whether a vote is necessary can be based on available data, e.g., trend data, prior estimates of demand, prior votes, and the like. If such data is available, and deemed to be relatively current or "fresh", then available demand/trend data can be used to avoid the burden of a vote event. To the extent it is determined that a vote is necessary, a vote selection is formed at step 324, a voting event is initiated at step 325 and vote results are collected and analyzed at step 326. Without limitation, vote selection can be based on one or more of available media content, current associations of media content with broadcast/multicast service, current demand, predictions, trends and so on. The vote selection can identify one or more media content items, e.g., streaming media programs, to be voted on. A simple vote can include selection of a particular program for multicast/broadcast association, a choice between different programs for multicast/broadcast association and/or a rank ordering of a number of programs.

Results of the analysis are provided to one of a media delivery system and/or a stream selector at step 327. At step 328, the media delivery system changes available program selection based on analysis results and optionally other data.

According to the illustrative process 330, the analysis of demand data and/or trend data at step 333 occurs before a vote 334-336. It is understood that in at least some embodiments, the same analysis of demand data and/or trend data at step 333 can be repeated, or an additional analysis of demand data and/or trend data can be included after collection and analysis of the voting results at step 336. In some embodiments, the collecting and analyzing of results data at 336 can include one or more of the same analyses of demand data and/or trend data at step 333.

Analysis of demand data, and/or trend data and/or voting results can include one or more analytical techniques. Analytical techniques can include, without limitation, a tally or count or similar measure of demand for one or more media content items. Preferential demand can be used alone or in combination with other data, such as trend data and data obtained from other systems, e.g., social media. Different types of demand and/or trend data can be combined according to an algorithm, e.g., have equal weights, or different weights. Alternatively or in addition, different types of demand data can be used to the exclusion of other demand data. For example, when instantaneous demand is available, it can be used to the exclusion of trend data.

It is understood that in at least some embodiments, limits can be applied. For example, if instantaneous demand is above a demand threshold, then use the instantaneous demand to the exclusion of trend data. Alternatively or in addition, if preferential demand is below a predetermined demand threshold, then exclude preferential demand, or discount its prevalence when combined with other date, such as trend data.

Figure 3D:
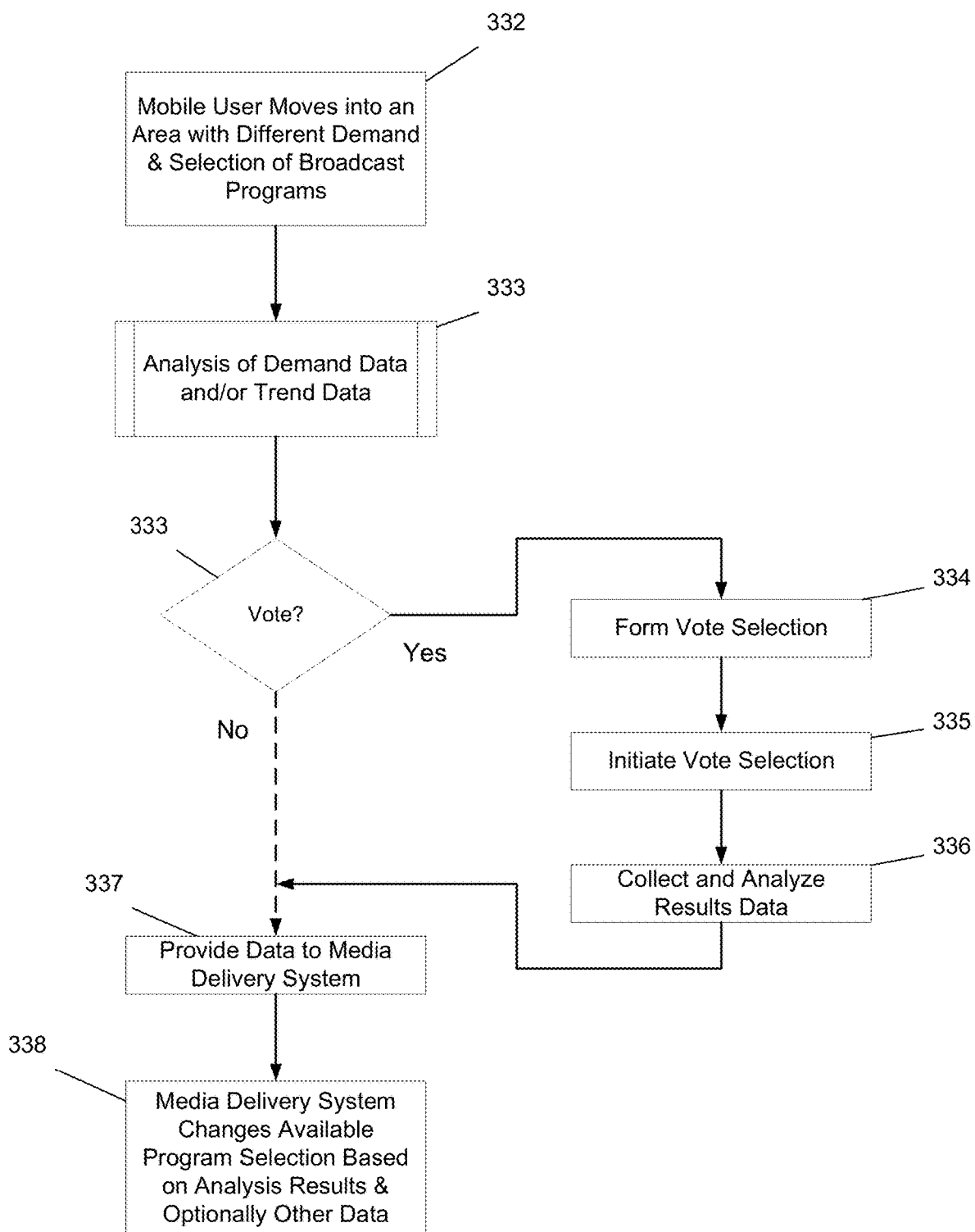
FIG. 3D depicts an illustrative embodiment of a mobile-user, stream selection process in accordance with various aspects described herein.

FIG. 3D depicts an illustrative embodiment of a demand content process 330, e.g., demand content process 316 (FIG. 3B) in accordance with various aspects described herein. The process 330 is directed to an area demand vote. At step 332, mobility of a user is examined to determine that the user has moved into an area with a different demand and/or selection of broadcast programs. Demand data and/or trend data is analyzed at step 334.

In at least some embodiments, a determination is made at step 333 as to whether a vote is necessary. In at least some embodiments, a determination whether a vote is necessary can base based on available data, e.g., trend data, prior estimates of demand, prior votes, and the like. If such data is available, and deemed to be relatively current or "fresh" then available demand/trend data can be used to avoid the burden of a vote event. To the extent it is determined that a vote is necessary, a vote selection is formed at step 334, a voting event is initiated at step 335 and vote results are collected and analyzed at step 336.

Results of the analysis are provided to one of a media delivery system and/or a stream selector at step 337. At step 338, the media delivery system changes available program selection based on analysis results and optionally other data.

Figure 3E:
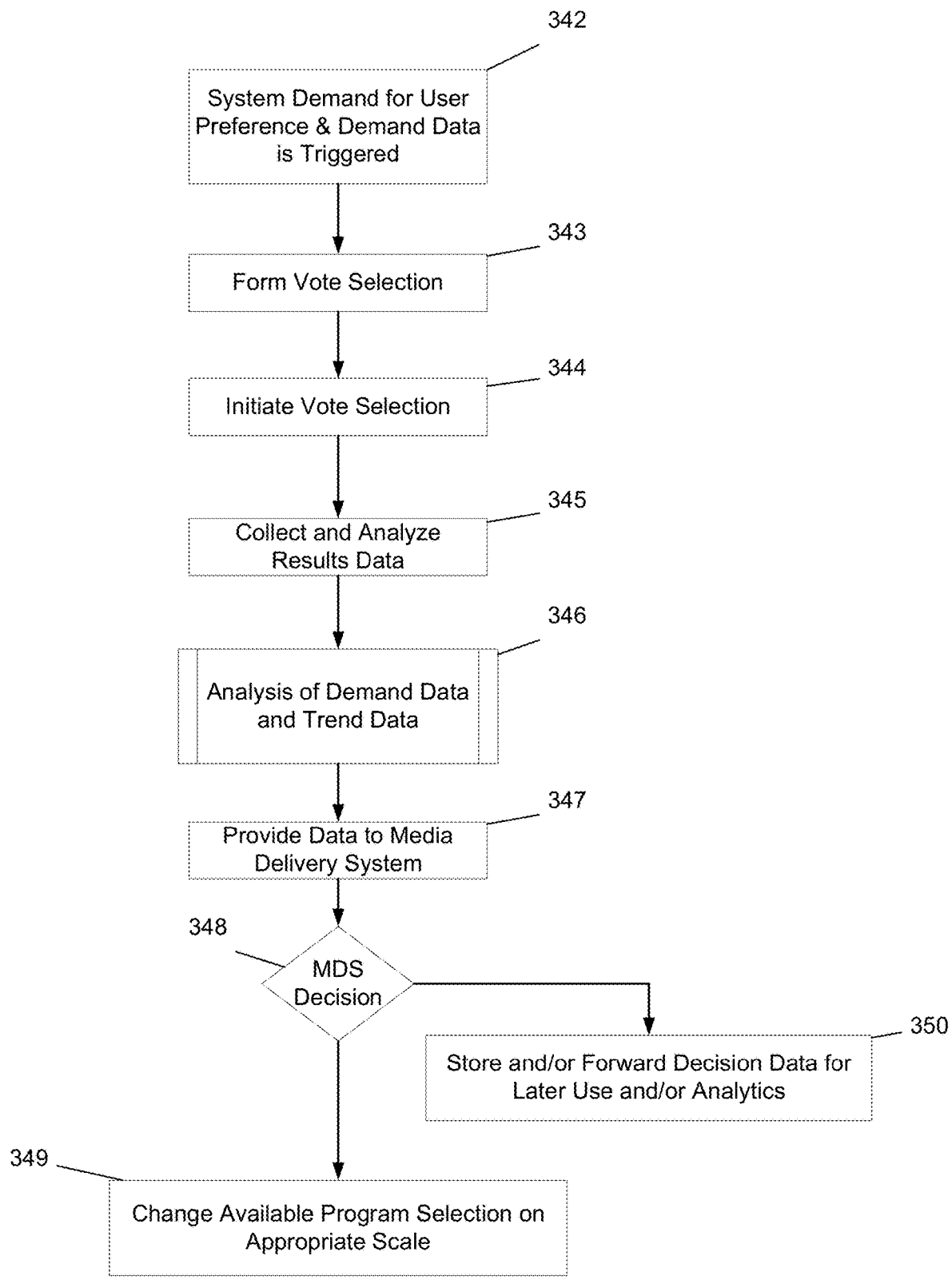
FIG. 3E depicts an illustrative embodiment of a triggered, stream selection process in accordance with various aspects described herein.

FIG. 3E depicts an illustrative embodiment of a triggered, stream selection process 340, e.g., demand content process 316 (FIG. 3B) in accordance with various aspects described herein. The process 340 is directed to a wide cast vote, e.g., applied in multiple service areas, such as multiple cells and/or sectors of a mobile cellular network. At step 342, a trigger is encountered. The trigger can be used to obtain system demand for user preference and/or demand data. A vote selection is formed at step 343, a voting event is initiated at step 344 and vote results are collected and/or analyzed at step 345.

Analysis of the demand and/or trend data is performed at step 346. Analysis can be performed according to one or more analytical techniques, such as any of the various example techniques disclosed herein.

Results of the analysis are provided to one of a media delivery system and/or a stream selector at step 347. At step 348, the media delivery system determines whether current changes are applicable or whether the analysis results should applied to later use. To the extent it is determined that the analysis results should be used currently, associations of available program selections with broadcast/multicast services are applied at step 349. As the process 340 relies upon wide cast voting, it is understood that associations of available program selections with broadcast/multicast services can be applied to one or more cells and/or sectors. It is further understood that the particular results applied to the different cells and/or sectors can be the same, have some common associations and/or be independent and/or entirely different. Changes to available program selection may be based on analysis results and optionally other data. To the extent it is determined that the analysis results should be applied to later use, decision data is stored and/or forwarded, e.g., to cell sites, for later use and/or for analytics at step 350.

While for purposes of simplicity of explanation, the respective processes are shown and described as a series of blocks in FIGS. 3B-E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3F:
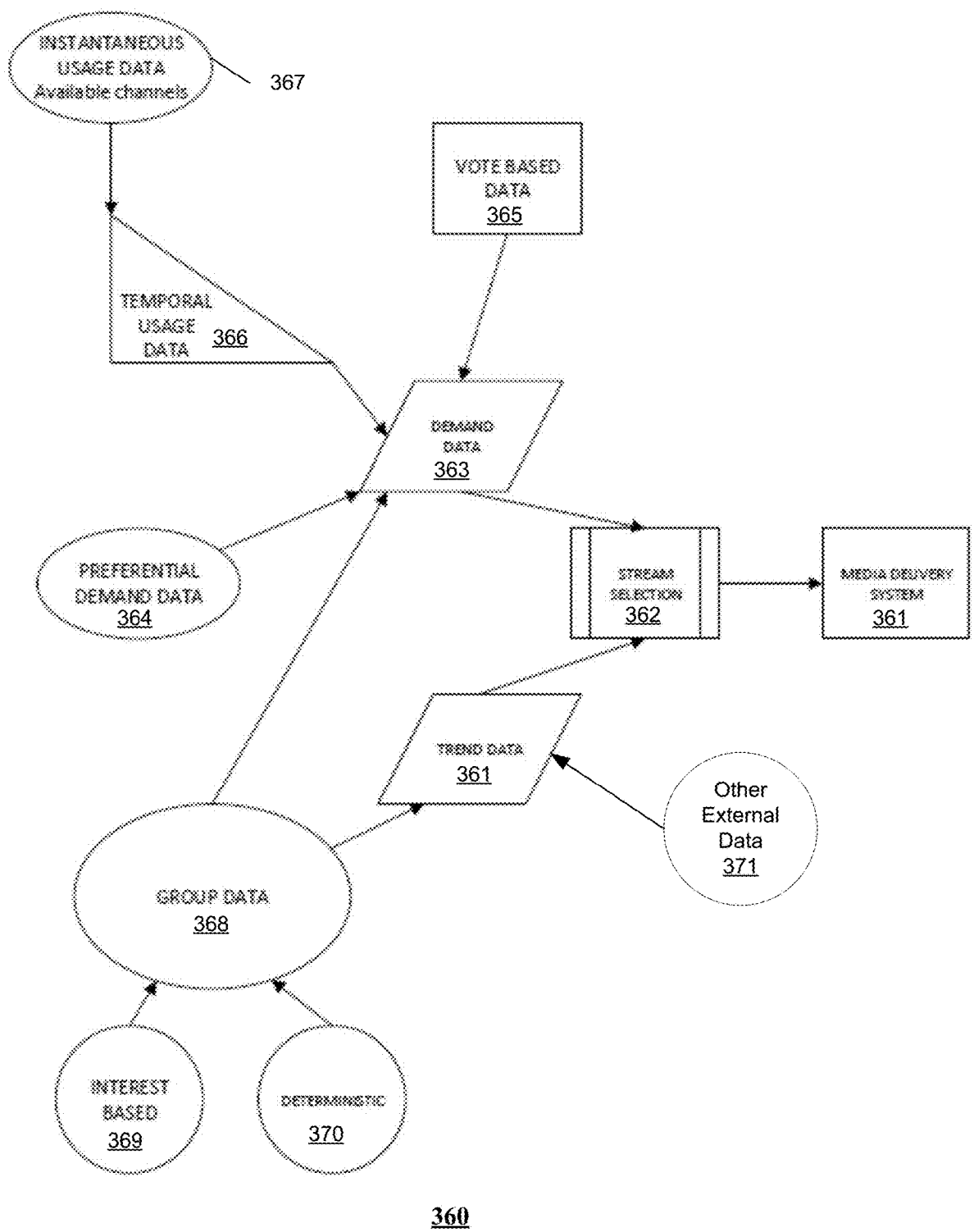
FIG. 3F is a block diagram illustrating an example, non-limiting embodiment of a system functioning within the communication network of FIGS. 1, 2 and 3A in accordance with various aspects described herein.

FIG. 3F is a block diagram illustrating an example, non-limiting embodiment of a system 360 functioning within the communication network of FIGS. 1, 2 and 3A in accordance with various aspects described herein. The system 360 determines demand and/or trend data from one or more sources and provides the demand and/or trend data to a stream selector 362. The stream selector implements one or more algorithms to select streams for association with broadcast/multicast service. Identification of the selected stream(s) is provided to a media delivery system 361. The media delivery system 361, in turn, implements broadcast/multicast service for the selected stream(s).

According to the illustrative example, demand data 363 can be determined according to one or more of vote-based data 365, preferential demand data 364 and/or temporal usage data 366. Temporal usage data can be determined at least in part according to instantaneous usage data, e.g., data obtained from available channels of a media delivery system 361. In at least some embodiments, the demand data can be based on group data 368. Group data, in turn, can be based on data obtained according to interest based groups 369 and/or data obtained according to deterministic groups 370.

Group data 368 can be influential to the system 360 as demand data 363 and/or trend data 361, e.g., when used in a deterministic manner. This is possible when the system 360 groups users based according to predetermined distinguishing factors. External or internal data can be used to allow the system 360 to group users. It is understood that users can be part of multiple groups. Group subscription may be voluntary or involuntary. Examples include: Interest based groups—users with similar interests such as a content type, artistic interests, musical interests, cinematography, fandom, famous directors, personal interests. According to deterministic groups 370, users are segmented by defined or determined factors. Examples include user selection history, user subscribed group selection history, matching group trend data, voting history, age, gender, educational background, professional associations, address, etc. These groups may be self-identified by a participating user or inferred by user data, etc.

As inferred by the examples, these sub-components can be used individually or in combination to provide a precise, controlled, and customizable experience to a user within a broadcast system where existing and/or variable factors including location, network, system, demand, trend, and other factors can be combined with Content Delivery Network provider's needs based on their business models and contractual agreements to provide a consistently flexible, interesting and dynamic list of content to the user.

In at least some embodiments, the stream selector 362 receives input based on trend data 361. Trend data can be based on group data 368 and/or other external data 371. Other external data can include one or more of newsfeeds, network status, trending topics on other systems, and so on.

Referring now to FIG. 4, a block diagram 400 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200, the subsystems and functions of communication network 300, the subsystems and functions of system 360, presented in FIGS. 1, 2, 3A and 3F and the processes 310, 320, 330, 340 presented in FIGS. 3B, 3C, 3D and 3E.

In particular, a cloud networking architecture is shown that leverages cloud technologies and supports rapid innovation and scalability via a transport layer 450, a virtualized network function cloud 425 and/or one or more cloud computing environments 475. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements 430, 432, 434, 436 etc. that perform some or all of the functions of network elements 250, 252, 254, 256, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 250 (shown in FIG. 2), such as an edge router can be implemented via a virtual network element 430 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In some embodiments, one or more of the virtual network elements can include a virtual stream selector 436 supporting a stream selection function. For example, the virtual stream selector 436 determines demand and/or trend data for one or more wireless access territories or cells. The virtual stream selector 436 can be adapted to implement all or at least portions of one or more of the stream selection processes disclosed herein, such as those processes 310, 320, 330, 340 disclosed in FIGS. 3B-3E.

In an embodiment, the transport layer 450 includes fiber, cable, wired and/or wireless transport elements, network elements and interfaces to provide broadband access 210, wireless access 220, voice access 230, media access 240 and/or access to content sources 275 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as virtual network elements 430, 432, 434 or 436. These network elements can be included in transport layer 450.

The virtualized network function cloud 425 interfaces with the transport layer 450 to provide the virtual network elements 430, 432, 434, 436 etc. to provide specific NFVs. In particular, the virtualized network function cloud 425 leverages cloud operations, applications, and architectures to support networking workloads. The virtualized network elements 430, 432, 434 and 436 can employ network function software that provides either a one-for-one mapping of traditional network element function or alternately some combination of network functions designed for cloud computing. For example, virtualized network elements 430, 432, 434 and 436 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 430, 432, 434, 436 etc. can be instantiated and managed using an orchestration approach similar to those used in cloud compute services.

The cloud computing environments 475 can interface with the virtualized network function cloud 425 via APIs that expose functional capabilities of the VNE 430, 432, 434, etc. to provide the flexible and expanded capabilities to the virtualized network function cloud 425. In particular, network workloads may have applications distributed across the virtualized network function cloud 425 and cloud computing environment 475 and in the commercial cloud, or might simply orchestrate workloads supported entirely in NFV infrastructure from these third party locations.

Figure 5:
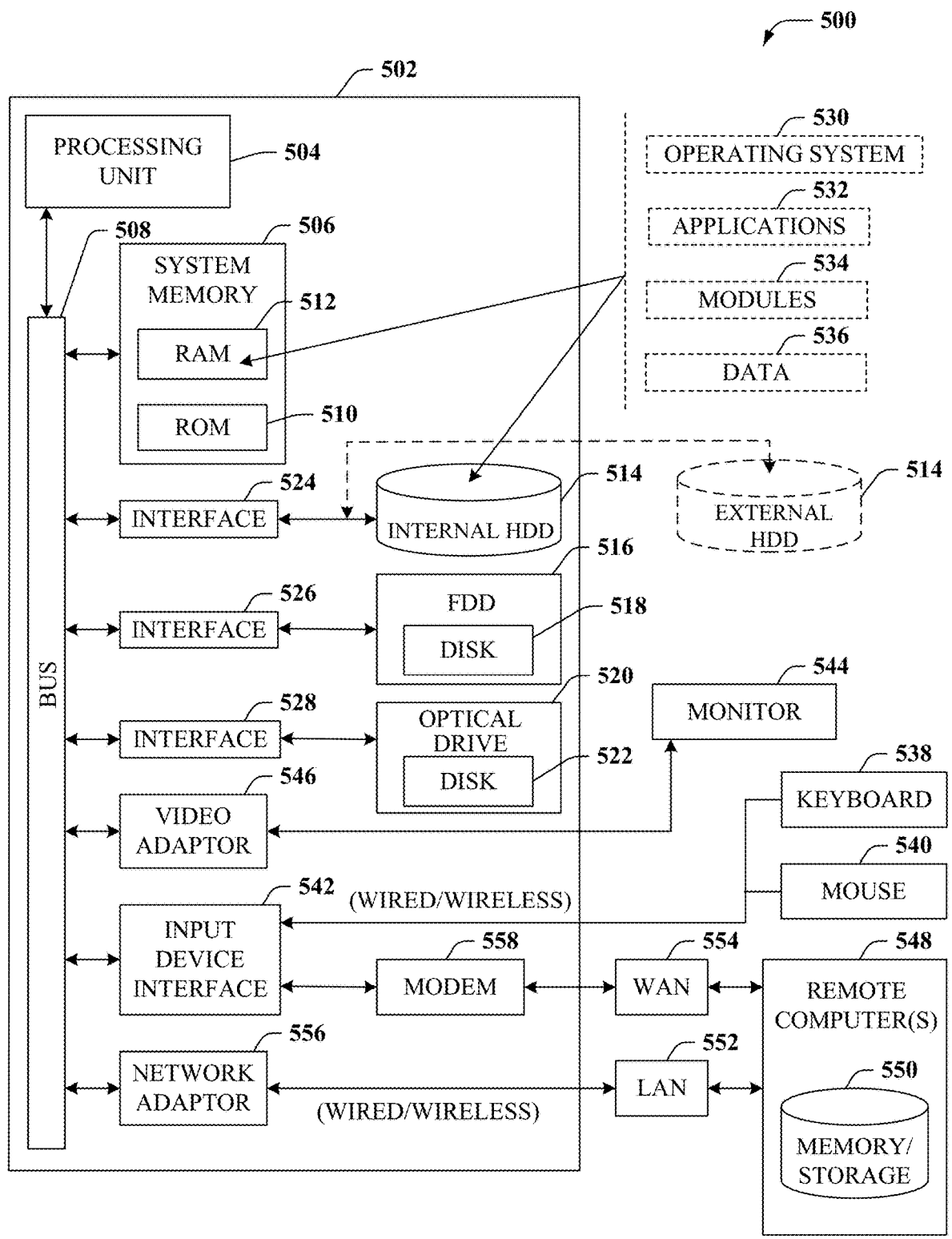
FIG. 5 is a block diagram of an example, non-limiting embodiment of a computing environment in accordance with various aspects described herein.

Turning now to FIG. 5, there is illustrated a block diagram of a computing environment in accordance with various aspects described herein. In order to provide additional context for various embodiments of the embodiments described herein, FIG. 5 and the following discussion are intended to provide a brief, general description of a suitable computing environment 500 in which the various embodiments of the subject disclosure can be implemented. In particular, computing environment 500 can be used in the implementation of network elements 125, 132, 134, 138, 136, 140, 150, 175, 180, 182, 184, 186, 188, 191, 192, 193, of FIG. 1, network elements 250, 252, 254, 256, access terminal 212, base station or access point 222, switching device 232, media terminal 242, of FIG. 2, media delivery system 301, content delivery network 303, wireless access terminals 305, stream selector 307, MDS system data 308, other systems 309 of FIG. 3A, and/or virtual network elements 430, 432, 434, 436 of FIG. 4 etc. Each of these devices can be implemented via computer-executable instructions that can run on one or more computers, and/or in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 5, the example environment can comprise a computer 502, the computer 502 comprising a processing unit 504, a system memory 506 and a system bus 508. The system bus 508 couples system components including, but not limited to, the system memory 506 to the processing unit 504. The processing unit 504 can be any of various commercially available processors. Dual microprocessors and other multiprocessor architectures can also be employed as the processing unit 504.

The system bus 508 can be any of several types of bus structure that can further interconnect to a memory bus (with or without a memory controller), a peripheral bus, and a local bus using any of a variety of commercially available bus architectures. The system memory 506 comprises ROM 510 and RAM 512. A basic input/output system (BIOS) can be stored in a non-volatile memory such as ROM, erasable programmable read only memory (EPROM), EEPROM, which BIOS contains the basic routines that help to transfer information between elements within the computer 502, such as during startup. The RAM 512 can also comprise a high-speed RAM such as static RAM for caching data.

The computer 502 further comprises an internal hard disk drive (HDD) 514 (e.g., EIDE, SATA), which internal hard disk drive 514 can also be configured for external use in a suitable chassis (not shown), a magnetic floppy disk drive (FDD) 516, (e.g., to read from or write to a removable diskette 518) and an optical disk drive 520, (e.g., reading a CD-ROM disk 522 or, to read from or write to other high capacity optical media such as the DVD). The hard disk drive 514, magnetic disk drive 516 and optical disk drive 520 can be connected to the system bus 508 by a hard disk drive interface 524, a magnetic disk drive interface 526 and an optical drive interface 528, respectively. The interface 524 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 502, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 512, comprising an operating system 530, one or more application programs 532, other program modules 534 and program data 536. All or portions of the operating system, applications, modules, and/or data can also be cached in the RAM 512. The systems and methods described herein can be implemented utilizing various commercially available operating systems or combinations of operating systems.

A user can enter commands and information into the computer 502 through one or more wired/wireless input devices, e.g., a keyboard 538 and a pointing device, such as a mouse 540. Other input devices (not shown) can comprise a microphone, an infrared (IR) remote control, a joystick, a game pad, a stylus pen, touch screen or the like. These and other input devices are often connected to the processing unit 504 through an input device interface 542 that can be coupled to the system bus 508, but can be connected by other interfaces, such as a parallel port, an IEEE 1394 serial port, a game port, a universal serial bus (USB) port, an IR interface, etc.

A monitor 544 or other type of display device can be also connected to the system bus 508 via an interface, such as a video adapter 546. It will also be appreciated that in alternative embodiments, a monitor 544 can also be any display device (e.g., another computer having a display, a smart phone, a tablet computer, etc.) for receiving display information associated with computer 502 via any communication means, including via the Internet and cloud-based networks. In addition to the monitor 544, a computer typically comprises other peripheral output devices (not shown), such as speakers, printers, etc.

The computer 502 can operate in a networked environment using logical connections via wired and/or wireless communications to one or more remote computers, such as a remote computer(s) 548. The remote computer(s) 548 can be a workstation, a server computer, a router, a personal computer, portable computer, microprocessor-based entertainment appliance, a peer device or other common network node, and typically comprises many or all of the elements described relative to the computer 502, although, for purposes of brevity, only a memory/storage device 550 is illustrated. The logical connections depicted comprise wired/wireless connectivity to a local area network (LAN) 552 and/or larger networks, e.g., a wide area network (WAN) 554. Such LAN and WAN networking environments are commonplace in offices and companies, and facilitate enterprise-wide computer networks, such as intranets, all of which can connect to a global communications network, e.g., the Internet.

When used in a LAN networking environment, the computer 502 can be connected to the local network 552 through a wired and/or wireless communication network interface or adapter 556. The adapter 556 can facilitate wired or wireless communication to the LAN 552, which can also comprise a wireless AP disposed thereon for communicating with the wireless adapter 556.

When used in a WAN networking environment, the computer 502 can comprise a modem 558 or can be connected to a communications server on the WAN 554 or has other means for establishing communications over the WAN 554, such as by way of the Internet. The modem 558, which can be internal or external and a wired or wireless device, can be connected to the system bus 508 via the input device interface 542. In a networked environment, program modules depicted relative to the computer 502 or portions thereof, can be stored in the remote memory/storage device 550. It will be appreciated that the network connections shown are example and other means of establishing a communications link between the computers can be used.

The computer 502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 6:
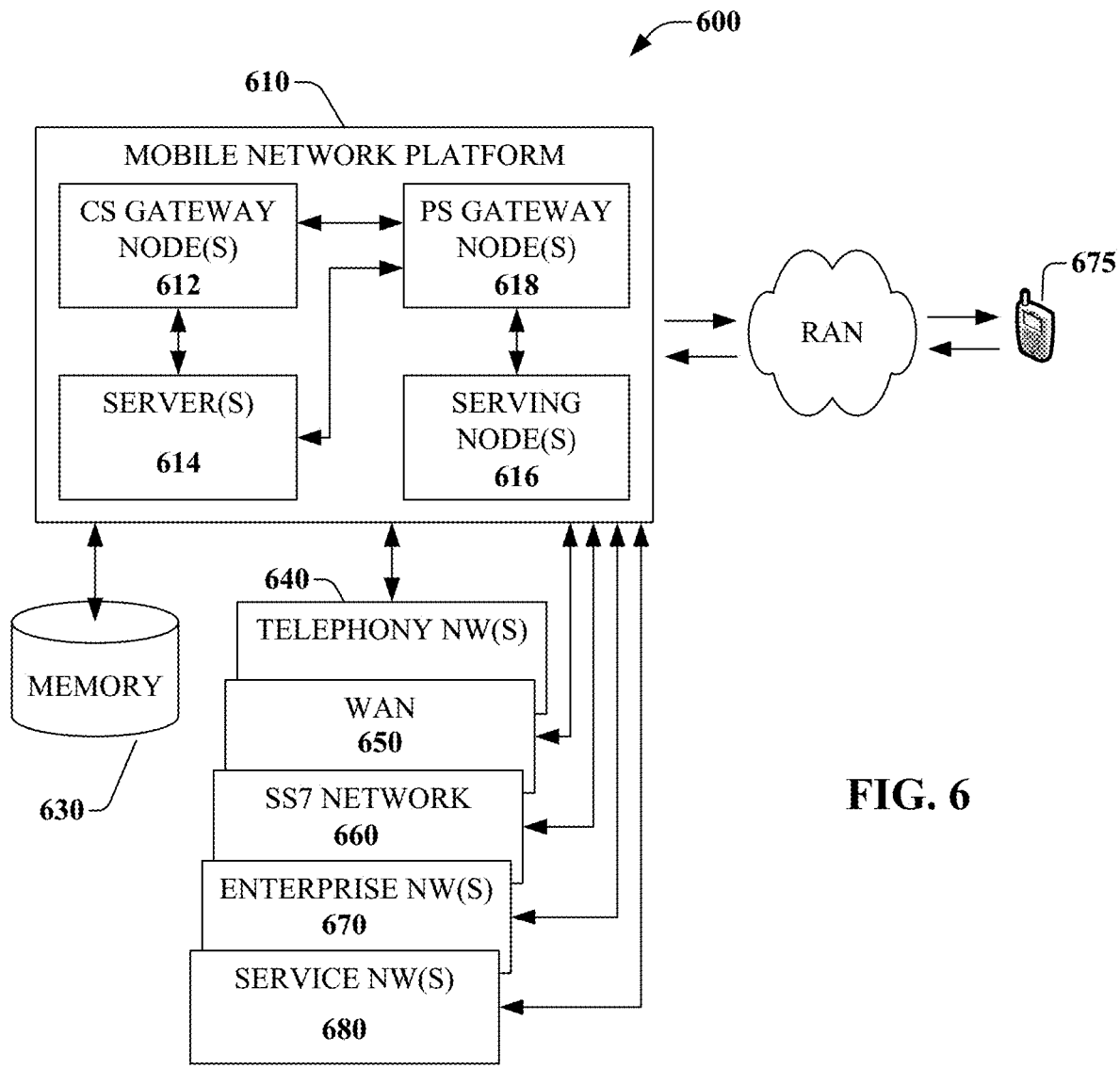
FIG. 6 is a block diagram of an example, non-limiting embodiment of a mobile network platform in accordance with various aspects described herein.

Turning now to FIG. 6, an embodiment 600 of a mobile network platform 610 is shown that is an example of network elements 125, 132, 134, 138, 136, 160, 161, 175, 180, 182, 184, 186, 188, 191, 192, 193, of FIG. 1, network elements 250, 252, 254, 256, access terminal 212, base station or access point 222, switching device 232, media terminal 242, of FIG. 2, media delivery system 301, content delivery network 303, wireless access terminals 305, user equipment 306, stream selector 307, MDS system data 308, other systems 309 of FIG. 3A, and/or virtual network elements 430, 432, 434, 436 of FIG. 4, etc. In one or more embodiments, the mobile network platform 610 can generate and receive signals transmitted and received by base stations or access points such as base station or access point 222. Generally, wireless network platform 610 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 610 can be included in telecommunications carrier networks, and can be considered carrier-side components as discussed elsewhere herein. Mobile network platform 610 comprises CS gateway node(s) 612 which can interface CS traffic received from legacy networks like telephony network(s) 640 (e.g., public switched telephone network (PSTN), or public land mobile network (PLMN)) or a signaling system #7 (SS7) network 670. Circuit switched gateway node(s) 612 can authorize and authenticate traffic (e.g., voice) arising from such networks. Additionally, CS gateway node(s) 612 can access mobility, or roaming, data generated through SS7 network 670; for instance, mobility data stored in a visited location register (VLR), which can reside in memory 630. Moreover, CS gateway node(s) 612 interfaces CS-based traffic and signaling and PS gateway node(s) 618. As an example, in a 3GPP UMTS network, CS gateway node(s) 612 can be realized at least in part in gateway GPRS support node(s) (GGSN). It should be appreciated that functionality and specific operation of CS gateway node(s) 612, PS gateway node(s) 618, and serving node(s) 616, is provided and dictated by radio technology(ies) utilized by mobile network platform 610 for telecommunication.

In addition to receiving and processing CS-switched traffic and signaling, PS gateway node(s) 618 can authorize and authenticate PS-based data sessions with served mobile devices. Data sessions can comprise traffic, or content(s), exchanged with networks external to the wireless network platform 610, like wide area network(s) (WANs) 650, enterprise network(s) 670, and service network(s) 680, which can be embodied in local area network(s) (LANs), can also be interfaced with mobile network platform 610 through PS gateway node(s) 618. It is to be noted that WANs 650 and enterprise network(s) 660 can embody, at least in part, a service network(s) like IP multimedia subsystem (IMS). Based on radio technology layer(s) available in technology resource(s) 617, packet-switched gateway node(s) 618 can generate packet data protocol contexts when a data session is established; other data structures that facilitate routing of packetized data also can be generated. To that end, in an aspect, PS gateway node(s) 618 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 600, wireless network platform 610 also comprises serving node(s) 616 that, based upon available radio technology layer(s) within technology resource(s) 617, convey the various packetized flows of data streams received through PS gateway node(s) 618. It is to be noted that for technology resource(s) that rely primarily on CS communication, server node(s) can deliver traffic without reliance on PS gateway node(s) 618; for example, server node(s) can embody at least in part a mobile switching center. As an example, in a 3GPP UMTS network, serving node(s) 616 can be embodied in serving GPRS support node(s) (SGSN).

For radio technologies that exploit packetized communication, server(s) 614 in wireless network platform 610 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 610. Data streams (e.g., content(s) that are part of a voice call or data session) can be conveyed to PS gateway node(s) 618 for authorization/authentication and initiation of a data session, and to serving node(s) 616 for communication thereafter. In addition to application server, server(s) 614 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 610 to ensure network's operation and data integrity in addition to authorization and authentication procedures that CS gateway node(s) 612 and PS gateway node(s) 618 can enact. Moreover, provisioning server(s) can provision services from external network(s) like networks operated by a disparate service provider; for instance, WAN 650 or Global Positioning System (GPS) network(s) (not shown). Provisioning server(s) can also provision coverage through networks associated to wireless network platform 610 (e.g., deployed and operated by the same service provider), such as the distributed antennas networks shown in FIGS. 1 and 2 that enhance wireless service coverage by providing more network coverage.

It is to be noted that server(s) 614 can comprise one or more processors configured to confer at least in part the functionality of macro wireless network platform 610. To that end, the one or more processor can execute code instructions stored in memory 630, for example. It is should be appreciated that server(s) 614 can comprise a content manager, which operates in substantially the same manner as described hereinbefore.

In example embodiment 600, memory 630 can store information related to operation of wireless network platform 610. Other operational information can comprise provisioning information of mobile devices served through wireless platform network 610, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 630 can also store information from at least one of telephony network(s) 640, WAN 650, enterprise network(s) 670, or SS7 network 660. In an aspect, memory 630 can be, for example, accessed as part of a data store component or as a remotely connected memory store.

In order to provide a context for the various aspects of the disclosed subject matter, FIG. 6, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 7:
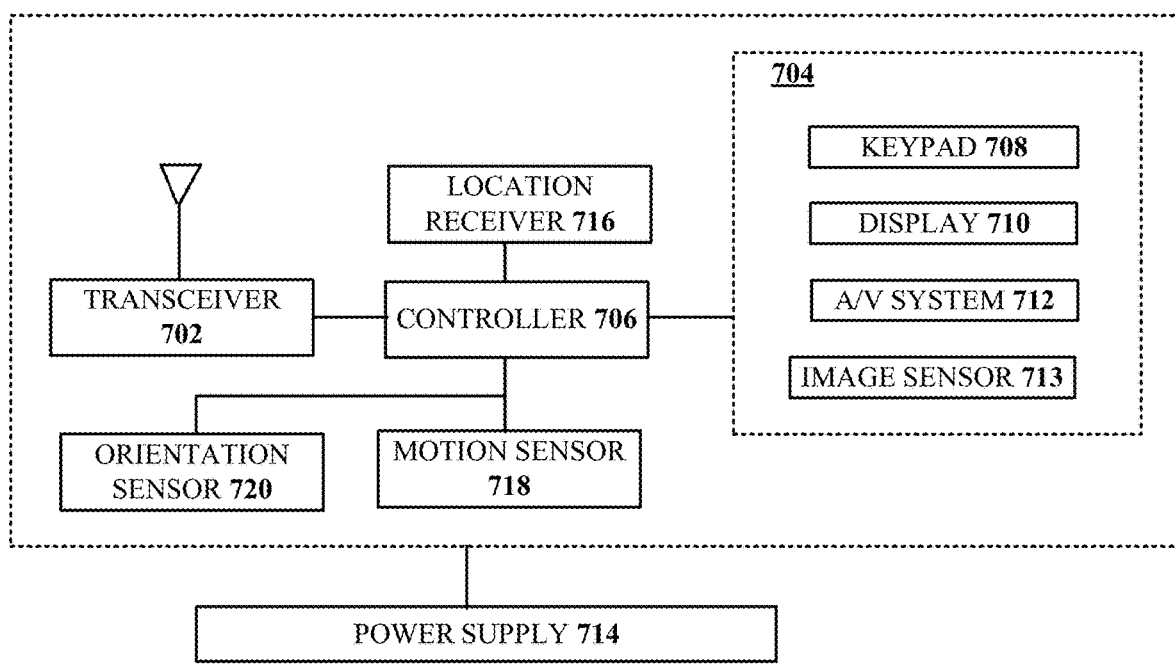
FIG. 7 is a block diagram of an example, non-limiting embodiment of a communication device in accordance with various aspects described herein.

Turning now to FIG. 7, an illustrative embodiment of a communication device 700 is shown. The communication device 700 can serve as an illustrative embodiment of devices such as endpoint devices 160, 161 of FIG. 1, broadband access terminals 212, data terminals 214, mobile devices 224, vehicle 226, display devices 244 or other client devices for communication via either communications network 225, user equipment 306 of FIG. 3A.

The communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface having graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable communications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

Media content can include, without limitation, streaming media, such as streaming video and/or streaming audio. In at least some applications, streaming media can be associated with live events, e.g., live news broadcasts, sporting events, emergency broadcasts, and the like. Live events can include, without limitation, electronic gaming, e.g., wherein the media content includes one or more of game scenarios, game sounds, game player communications, and so on. Alternatively or in addition, streaming media can be associated with pre-programmed content, e.g., according to a channel lineup, a service provider's offerings, and the like. It is further understood that in at least some applications, media content can include other types of media, such as file transfers, advertisements, software and/or firmware distributions, e.g., in association with Machine Type Communications (MTC) or Machine-to-Machine (M2M) communications according to Internet of Thigs (IoT) applications, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
detecting mobility of a plurality of subscriber equipment devices with respect to a coverage area within which a mobile cellular network is adapted to broadcast streaming media, the detecting resulting in detected mobility;
soliciting, responsive to the detected mobility, a plurality of votes, the plurality of votes comprising a respective vote from each of the plurality of subscriber equipment devices, each vote including a respective rank ordering of a plurality of available streaming media programs, and each respective rank ordering together forming a plurality of rank orderings;
determining a consumer demand for a group of streaming media programs of the plurality of available streaming media programs according to the rank orderings of the plurality of votes;
selecting streaming media programs of the group of streaming media programs to obtain selected streaming media programs according to the consumer demand, wherein a broadcasting of the selected streaming media programs within the coverage area does not exceed a limited channel capacity of a number of wireless broadcast channels of the mobile cellular network; and
assigning the selected streaming media programs to a group of broadcast channels of the number of wireless broadcast channels to obtain a broadcast channel assignment for the coverage area, wherein the mobile cellular network is configured to broadcast the selected streaming media programs within the coverage area via wireless broadcast channels of the number of wireless broadcast channels according to the broadcast channel assignment.

2. The device of claim 1, wherein the soliciting the plurality of votes comprises:
implementing a voting event;
obtaining voting results responsive to the implementing the voting event; and
analyzing the voting results, resulting in analyzed results, wherein the determining the consumer demand is based on the analyzed results.

3. The device of claim 2, wherein the analyzing the voting results comprises:

ranking the group of streaming media programs to obtain a ranked order of the group of streaming media programs based on the voting results, wherein the selecting the streaming media programs of the group of streaming media programs is further based on the ranked order of the group of streaming media programs.

4. The device of claim 3, wherein the broadcast channel assignment is further based on the ranked order of the group of streaming media programs.

5. The device of claim 1, wherein broadcasting of the selected streaming media programs according to the broadcast channel assignment distributes the selected streaming media programs to a plurality of mobile consumer devices within the coverage area.

6. The device of claim 5, wherein the broadcasting of a particular selected streaming media program of the selected streaming media programs according to the broadcast channel assignment comprises an IP multicast of the particular selected streaming media program.

7. The device of claim 1, wherein the soliciting the plurality of votes comprises a wide cast vote applied to multiple cells of the mobile cellular network or multiple sectors of the mobile cellular network.

8. The device of claim 1, wherein the detecting the mobility of the plurality of subscriber equipment devices with respect to the coverage area comprises detecting the plurality of subscriber equipment devices entering the coverage area or exiting the coverage area.

9. The device of claim 1, wherein the determining the consumer demand comprises determining a current demand based on current media content consumption of streaming media programs of the plurality of available streaming media programs.

10. The device of claim 1, wherein the determining the consumer demand comprises determining a trend according to media content consumption of the plurality of available streaming media programs.

11. A method, comprising:
identifying, by a processing system including a processor, mobility of a plurality of subscriber equipment devices with respect to a coverage area within which a mobile network is adapted to broadcast streaming media items, the identifying resulting in identified mobility;
requesting, by the processing system and responsive to the identified mobility, a plurality of votes, the plurality of votes comprising a respective vote from each of the plurality of subscriber equipment devices, each vote of the plurality of votes including a respective rank ordering of a plurality of available streaming media items, each respective rank ordering together forming a plurality of rank orderings;
determining, by the processing system, a user demand for a group of streaming media items of the plurality of available streaming media items according to the plurality of rank orderings;
selecting, by the processing system, streaming media items of the group of streaming media items to obtain selected streaming media items according to the user demand, wherein a broadcasting of the selected streaming media items within the coverage area does not exceed a limited channel capacity of a number of wireless broadcast channels of the mobile network; and
assigning, by the processing system, the selected streaming media items to a group of broadcast channels of the number of wireless broadcast channels to obtain a broadcast channel assignment for the coverage area, wherein the mobile network is configured to broadcast the selected streaming media items within the coverage area via wireless broadcast channels of the number of wireless broadcast channels according to the broadcast channel assignment.

12. The method of claim 11, wherein the requesting the plurality of votes comprises:
initiating, by the processing system, a voting event;
obtaining, by the processing system, voting results responsive to the initiating the voting event; and
analyzing, by the processing system, the voting results, wherein the user demand is based on the voting results.

13. The method of claim 12, wherein the analyzing the voting results comprises:
ranking the group of streaming media items to obtain a ranked order of the group of streaming media items based on the voting results, wherein the selecting the streaming media items of the group of streaming media items is further based on the ranked order of the group of streaming media items.

14. The method of claim 13, wherein the broadcast channel assignment is based on the ranked order of the group of streaming media items.

15. The method of claim 11, wherein the broadcast of the selected streaming media items within the coverage area via the wireless broadcast channels of the number of wireless broadcast channels according to the broadcast channel assignment distributes the selected streaming media items to a plurality of mobile consumer devices within the coverage area.

16. The method of claim 11, wherein the identifying the mobility of the plurality of subscriber equipment devices with respect to the coverage area comprises detecting the plurality of subscriber equipment devices entering the coverage area or exiting the coverage area.

17. A non-transitory machine-readable medium comprising executable instructions that, when executed by a processing system including a processor, facilitate performance of operations, the operations comprising:
detecting mobility of a plurality of subscriber equipment devices with respect to a coverage area within which a wireless network is adapted to broadcast media content items, the detecting resulting in detected mobility;
soliciting, responsive to the detected mobility, a plurality of votes, the plurality of votes comprising a respective vote from each of the plurality of subscriber equipment devices, each vote of the plurality of votes including a respective rank ordering of a plurality of available media content items, each respective rank ordering together forming a plurality of rank orderings;
determining a demand for a group of media content items of the plurality of available media content items according to the plurality of rank orderings;
selecting media content items of the group of media content items to obtain selected media content items according to the demand, wherein a broadcasting of the selected media content items within the coverage area does not exceed a limited channel capacity of a number of wireless broadcast channels of the wireless network; and
assigning the selected media content items to a group of broadcast channels of the number of wireless broadcast channels to obtain a broadcast channel assignment for the coverage area, wherein the wireless network is configured to broadcast the selected media content items within the coverage area via wireless broadcast channels of the number of wireless broadcast channels according to the broadcast channel assignment.

18. The non-transitory machine-readable medium of claim 17, wherein the soliciting the plurality of votes comprises:

initiating a voting event;

obtaining voting results responsive to the initiating the voting event; and analyzing the voting results, wherein the demand is based on the voting results.

19. The non-transitory machine-readable medium of claim 18, wherein the analyzing the voting results comprises:

ranking the group of media content items to obtain a ranked order of the group of media content items based on the voting results, wherein the selecting the media content items of the group of media content items is further based on the ranked order of the group of media content items.

20. The non-transitory machine-readable medium of claim 17, wherein the detecting the mobility of the plurality of subscriber equipment devices with respect to the coverage area comprises one of detecting the plurality of subscriber equipment devices entering the coverage area, detecting the plurality of subscriber equipment devices exiting the coverage area, or a combination thereof.

\* \* \* \* \*